US007952555B2

(12) United States Patent
Sakai

(10) Patent No.: US 7,952,555 B2
(45) Date of Patent: May 31, 2011

(54) LUMINANCE CONTROL METHOD, LIQUID CRYSTAL DISPLAY DEVICE AND COMPUTER PROGRAM

(75) Inventor: Yoshikazu Sakai, Hakusan (JP)

(73) Assignee: Eizo Nanao Corporation, Ishikawa (JP)

( * ) Notice: Subject to any disclaimer, the term of this patent is extended or adjusted under 35 U.S.C. 154(b) by 1165 days.

(21) Appl. No.: 10/579,740

(22) PCT Filed: Nov. 12, 2004

(86) PCT No.: PCT/JP2004/017102

§ 371 (c)(1), (2), (4) Date: May 18, 2006

(87) PCT Pub. No.: WO2005/050614

PCT Pub. Date: Jun. 2, 2005

(65) Prior Publication Data

US 2007/0152949 A1 Jul. 5, 2007

(30) Foreign Application Priority Data

Nov. 19, 2003 (JP) ................................ 2003-389900

(51) Int. Cl.
*G09G 3/36* (2006.01)
*G09G 5/10* (2006.01)
*G06F 3/038* (2006.01)

(52) U.S. Cl. ......................... 345/102; 345/207; 345/690

(58) Field of Classification Search .................. 345/102, 345/690, 207

See application file for complete search history.

(56) References Cited

U.S. PATENT DOCUMENTS 5,406,305 A * 4/1995 Shimomura et al. .......... 345/102
5,786,801 A * 7/1998 Ichise ........................... 345/102
6,188,380 B1 * 2/2001 Kawashima et al. ......... 345/102
6,297,791 B1 10/2001 Naito et al.
6,762,741 B2 * 7/2004 Weindorf ...................... 345/102
2001/0008395 A1 * 7/2001 Yamamoto et al. ........... 345/102
2002/0036646 A1 3/2002 Tobiya
2003/0174262 A1 9/2003 Sugawara et al.
2003/0231158 A1 * 12/2003 Someya et al. ............... 345/101
2003/0231161 A1 * 12/2003 Yamaguchi ................... 345/102

FOREIGN PATENT DOCUMENTS

EP 0 861 017 A2 8/1998

(Continued)

OTHER PUBLICATIONS

Noriyuki Hashimoto, Japanese Journal of Radiological Technology, 2002, 1297-1302, 58-10.

*Primary Examiner* — Bipin Shalwala
*Assistant Examiner* — Benyam Ketema
(74) *Attorney, Agent, or Firm* — Birch, Stewart, Kolasch & Birch, LLP

(57) ABSTRACT

A luminance detected by a built-in photosensor and a luminance of light emitted from a backlight through a liquid crystal panel are measured in a plurality of states where the backlight has a different luminance, and are preliminarily stored in a storage unit. Moreover, a luminance of light emitted through the liquid crystal panel in each input level when the maximum luminance of light emitted through the liquid crystal panel is a predetermined value is measured and is preliminarily stored in the storage unit. The maximum luminance of light emitted through the liquid crystal panel is then accepted, the luminance of the backlight is controlled, the luminance in each input level and an ideal luminance in each gray level are calculated, and an input level which gives a luminance substantially equal to the ideal luminance in each gray level is obtained to update an LUT.

11 Claims, 20 Drawing Sheets

FOREIGN PATENT DOCUMENTS

| | | | |
|---|---|---|---|
| EP | 0 883 103 | A1 | 12/1998 |
| JP | 5-8900 | U | 2/1997 |
| JP | 9-43569 | A | 2/1997 |
| JP | 10-222129 | A | 8/1998 |
| JP | 2000-315594 | A | 11/2000 |
| JP | 2002-99238 | A | 4/2002 |
| JP | 2002-162937 | A | 6/2002 |

* cited by examiner

FIG. 2

| INPUT LEVEL (−) | OUTPUT VOLTAGE (V) |
|---|---|
| 0000000000 (0) | $V_0$ |
| 0000000001 (1) | $V_1$ |
| 0000000010 (2) | $V_2$ |
| ⋮ | ⋮ |
| 1111111111 (1023) | $V_{1023}$ |

FIG. 8

| LUMINANCE LEVEL (−) | MAXIMUM LUMINANCE $L_{TMAX}$ ($cd/m^2$) |
|---|---|
| 1 | 600 |
| 2 | 500 |
| 3 | 400 |
| ⋮ | ⋮ |

FIG. 14

| GRAY LEVEL (INDEX) | INPUT LEVEL (VALUE) |
|---|---|
| 00000000 (0) | 0000000000 (0) |
| 00000001 (1) | 0000000101 (5) |
| 00000010 (2) | 0000001000 (8) |
| 00000011 (3) | 0000001001 (9) |
| ⋮ | ⋮ |
| 11111111 (255) | 1111111111 (1023) |

FIG. 15

(a)

DATA BEFORE CONVERSION

| | | | |
|---|---|---|---|
| 0 | 1 | 2 | 1 |
| 0 | 2 | 3 | 2 |
| 0 | 1 | 1 | 1 |
| 1 | 1 | 0 | 0 |

⇨

(b)

DATA AFTER CONVERSION

| | | | |
|---|---|---|---|
| 0 | 5 | 8 | 5 |
| 0 | 8 | 9 | 8 |
| 0 | 5 | 5 | 5 |
| 5 | 5 | 0 | 0 |

LUMINANCE CONTROL METHOD, LIQUID CRYSTAL DISPLAY DEVICE AND COMPUTER PROGRAM

CROSS-REFERENCE TO RELATED APPLICATIONS

This application is the national phase under 35 U.S.C. §371 of PCT International Application No. PCT/JP2004/17102 which has an International filing date of Nov. 17, 2004, which designated the United States of America.

TECHNICAL FIELD

The present invention relates to: a luminance control method for a liquid crystal display device comprising a liquid crystal panel and a backlight disposed at the back of the liquid crystal panel; a liquid crystal display device to which the luminance control method is applied; and a computer program for realizing the luminance control method with a computer.

BACKGROUND ART

A liquid crystal display device displays an image by controlling On/Off of each pixel in a liquid crystal panel on the basis of a video signal inputted from a personal computer (which will be hereinafter referred to as a PC) or the like and by applying to each pixel a data voltage according to the video signal with a built-in gate driver and a built-in source driver so as to control light transmittance determined by an electrooptical characteristic of a liquid crystal material.

The electrooptical characteristic of a liquid crystal material is determined by the distance between facing substrates, i.e. a liquid crystal gap, as well as the characteristics of the liquid crystal material itself (e.g. birefringent index). More specifically, in a case of a TN (Twisted Nematic) liquid crystal, for example, the transmission intensity I is determined by a per se known expression (1) using a parameter of a product of the birefringent index Δn and the liquid crystal gap d of the TN liquid crystal, i.e. the retardation Δn·d. It should be noted that the liquid crystal gap d is generally designed to be the first local minimum point ($(2\cdot\Delta n\cdot d)/\lambda=\sqrt{3}$, λ: wavelength) of the expression (1).

$$I = I_0 \frac{\sin^2\left(\frac{\pi}{2}\sqrt{1+\left(\frac{2\cdot\Delta n\cdot d}{\lambda}\right)^2}\right)}{1+\left(\frac{2\cdot\Delta n\cdot d}{\lambda}\right)^2} \quad \text{expression (1)}$$

FIG. 13 is a graph showing an example of the electrooptical characteristic of a liquid crystal material, wherein the abscissa axis denotes the voltage applied to the liquid crystal material while the ordinate axis denotes the light transmittance of the liquid crystal material. Referring to FIG. 13, a continuous line A denotes a characteristic obtained when the liquid crystal gap d satisfies $d=\lambda\cdot\sqrt{3}/(2\cdot\Delta n)$, a continuous line B denotes a characteristic obtained when the liquid crystal gap d satisfies $d<\lambda\cdot\sqrt{3}/(2\cdot\Delta n)$ and a continuous line C denotes a characteristic obtained when the liquid crystal gap d satisfies $d>\lambda\cdot\sqrt{3}/(2\cdot\Delta n)$, and it is understood that the light transmittance, which is an important quality, changes as the liquid crystal gap d changes, as shown by the above expression (1). Thus, the liquid crystal gap d, which is a parameter for determining the light transmittance of a liquid crystal display device, might be narrower or wider than a designed value due to a variation in manufacture, causing a problem that a desired light transmittance cannot be obtained and an intended gray-level display cannot be provided.

Known as a solution for this problem is a liquid crystal display device comprising a memory for storing a look-up table (which will be hereinafter referred to as an LUT) in which a gray level represented by the inputted video signal is associated with an input level to a liquid crystal panel corresponding to the gray level, whereby a desired gray-level characteristic can be realized by converting a gray level into an input level on the basis of the LUT and correcting specific characteristics of the device (see, for example, Patent Document 1).

The liquid crystal display device disclosed in the Patent Document 1 measures a luminance in each input level with an external photosensor (luminance meter) provided at the front of the liquid crystal panel and evaluates an actual panel gray-level characteristic of the liquid crystal panel. A gray level and an input level, which are to be written into the LUT, are calculated from the measured panel gray-level characteristic and the desired ideal gray-level characteristic, and stored in the LUT.

FIG. 14 is a concept view showing an example of the content of the LUT. The LUT stores a gray level as an index associated with an input level as a value. It should be noted that shown is an example wherein the number of gray levels is 8 bits (256) and the input level is 10 bits (1024), i.e. 2 bits larger than the number of gray levels. The LUT stores a gray level "0" associated with an input level "0", a gray level "1" associated with an input level "5", a gray level "2" associated with an input level "8", . . . , and a gray level "255" associated with an input level "1023". As shown in FIG. 15, the liquid crystal display device converts an inputted gray level (FIG. 15(*a*)) of each pixel into an input level (FIG. 15(*b*)) associated with the gray level on the basis of the LUT, and outputs it.

FIG. 16 is an explanatory view showing the concept of luminance control using the LUT. Referring to FIG. 16, the continuous line denotes an actual gray-level characteristic of the liquid crystal panel and the broken line denotes an ideal gray-level characteristic to be set. The liquid crystal display device converts a gray level X represented by the inputted video signal into an input level Y to the liquid crystal panel on the basis of the LUT to obtain a luminance Q, which gives an ideal gray-level characteristic, so as to realize an ideal gray-level characteristic artificially.

[Patent Document 1] Japanese Patent Application Laid-Open No. 2002-99238

DISCLOSURE OF THE INVENTION

Ideal gray-level characteristics are divided into two groups: one changes relatively to the maximum luminance, and the other one does not change relatively to the maximum luminance. A specific example of the former is a gamma characteristic, and a specific example of the latter is the gray-scale display function (which will be hereinafter referred to as the GSDF) compatible with the DICOM (standard for a medical imaging device).

FIG. 17 is a graph showing the gamma characteristic (γ=2.2), wherein the abscissa axis denotes a gray level and the ordinate axis denotes a luminance. The continuous line denotes a characteristic obtained when the luminance at 255-gray level (maximum luminance) is 600 cd/m$^2$ and the luminance at 0-gray level (minimum luminance) is 1 cd/m$^2$, and the broken line denotes a characteristic obtained when the maximum luminance is 300 cd/m$^2$ and the minimum luminance is 1 $cd/m^2$. The gamma characteristic is represented by a per se known expression (2). Each characteristic, when normalized by the maximum luminance, has a common characteristic (curve) despite a difference in the maximum luminance as shown in FIG. 18. Accordingly, conversion into a desired gray-scale characteristic can be performed without changing the LUT since the gray level for obtaining the same gray level does not change even when the luminance changes. That is, there is no need to change the LUT when the ideal gray-scale characteristic changes relatively to the maximum luminance.

$$L = (L_{max} - L_{min})\left(\frac{i}{255}\right)^{\gamma} + L_{min} \qquad \text{expression (2)}$$

L: luminance
i: gray level (0, 1, . . . , 255)
γ: gamma value
$L_{max}$: maximum luminance
$L_{min}$: minimum luminance FIG. 19 is a graph showing the GSDF compatible with the DICOM, wherein the abscissa axis denotes the gray level and the ordinate axis denotes the luminance. The continuous line denotes a characteristic obtained when the maximum luminance is 600 $cd/m^2$ and the minimum luminance is 1 $cd/m^2$, and the broken line denotes a characteristic obtained when the maximum luminance is 300 $cd/m^2$ and the minimum luminance is 1 $cd/m^2$. As shown in FIG. 20, each GSDF, when normalized by the maximum luminance, has a different characteristic (curve) according to the maximum luminance, differently from the above gamma characteristic. Since the gray level for obtaining the same gray level changes as the luminance changes, deviation from a desired gray-level characteristic arises unless the LUT is changed. For example, a gray level which gives the same normalized luminance Q (0.4 $cd/m^2$) is a gray level Y (203) when the maximum luminance is 600 $cd/m^2$, and is a gray level X (196) when the maximum luminance is 300 $cd/m^2$. The gray level thus differs ($X \neq Y$). Accordingly, there arises a need to change the LUT when the ideal gray-level characteristic does not change relatively to the maximum luminance.

However, there is a problem that change of the LUT needs measurement of an actual panel gray-level characteristic with an external photosensor every time, since the information to be stored in the LUT is conventionally obtained by measurement with an external photosensor in the production process of the liquid crystal display device. Though it is conceivable to preliminarily measure a panel gray-level characteristic for each possible maximum luminance and store a plurality of LUTs corresponding to the respective maximum luminance to perform correction, there is a problem that a rise in the cost is inevitable in this manner since a required capacity of a storage unit increases and there arises a need to generate and store a plurality of LUTs.

The above problem is caused by the fact that the liquid crystal display device, which is not a selfluminous display device, needs a backlight as a light source and the luminance of the backlight generally changes as the backlight is used. Aspects of the change in the luminance of the backlight include a fact that time (aging time) is required until the luminance is stabilized and a fact that the luminance gradually decreases depending on cumulative operating time.

Though it is said that the luminance of a conventional liquid crystal display device can be controlled, controlled is only the brightness, i.e. the ratio of luminance, so that a user cannot evaluate the luminance value during control (e.g. brightness 50%) and has to rely on his own sensitivity. That is, the brightness can be controlled only qualitatively, and there is no liquid crystal display device capable of controlling the luminance as desired, although it is desirable to control the luminance quantitatively according to conditions such as user preference, use environment and the type of a screen image to be displayed.

The present invention has been made with the aim of solving the above problems, and it is an object thereof to provide a luminance control method for a liquid crystal display device capable of controlling a luminance of a backlight and setting the luminance quantitatively by uniquely obtaining the relation between the luminance of the backlight and a luminance of light emitted from the backlight through a liquid crystal panel and by uniquely calculating the luminance of light emitted from the backlight through the liquid crystal panel on the basis of the luminance of the backlight.

Another object of the present invention is to provide a luminance control method for a liquid crystal display device capable of realizing a superior gray-level characteristic by obtaining an actual gray-level characteristic of a liquid crystal panel, by calculating a luminance to be set, i.e. a desired ideal gray-level characteristic, and by comparing both the gray-level characteristics to control the luminance.

Still further object of the present invention is to provide a liquid crystal display device to which the luminance control method is applied and a computer program for realizing the luminance control method with a computer.

A luminance control method according to the first aspect of the present invention is a luminance control method for a liquid crystal display device, which comprises a liquid crystal display panel and a backlight disposed at the back of the liquid crystal panel, for controlling an input level of a video signal to be inputted into the liquid crystal panel to control the transmittance of the liquid crystal panel and provide a gray-level display, wherein the liquid crystal display device further comprises luminance detecting means for detecting a luminance of the backlight, and the method comprises the steps of: measuring a luminance of light emitted from the backlight through the liquid crystal panel in a plurality of states where the liquid crystal panel has a predetermined transmittance and the backlight has a different luminance, and preliminarily storing the luminance measured in each state associated with the luminance detected by the luminance detecting means; setting a desired luminance set value of light emitted through the liquid crystal panel in a state where the liquid crystal panel has a predetermined transmittance; calculating a luminance to be detected by the luminance detecting means, which is to be the set luminance set value, on the basis of stored luminance in each state; and controlling the luminance of the backlight so as to be the calculated luminance.

A luminance control method according to the second aspect of the present invention, as set forth in the first aspect, further comprises the steps of: measuring a luminance of light emitted through the liquid crystal panel in each input level, and preliminarily storing the measured luminance associated with an input level which gives the luminance; calculating a luminance of light emitted through the liquid crystal panel in each input level and a luminance to be set in each gray level in a case of the luminance set value on the basis of the stored luminance and input level; extracting an input level which gives a luminance substantially equal to the luminance to be set in each gray level on the basis of the luminance in each calculated input level and the luminance to be set in each gray level, and storing the extracted input level associated with a gray level; and controlling the transmittance of the liquid crystal panel in a gray level associated with the input level of the video signal.

A luminance control method according to the third aspect of the present invention, as set forth in the first aspect, further comprises the steps of: measuring a luminance of light emitted through the liquid crystal panel in each input level; normalizing each measured luminance; and preliminarily storing each normalized luminance associated with an input level which gives the luminance; calculating a luminance of light emitted through the liquid crystal panel in each input level and a luminance to be set in each gray level in a case of the luminance set value on the basis of the stored luminance and input level; extracting an input level which gives a luminance substantially equal to the luminance to be set in each gray level on the basis of the luminance in each calculated input level and the luminance to be set in each gray level, and storing the extracted input level associated with a gray level; and controlling the transmittance of the liquid crystal panel in a gray level associated with the input level of the video signal.

In a luminance control method according to the fourth aspect of the present invention, as set forth in any one of the first to the third aspects, the luminance set value is a luminance in a state where the transmittance of the liquid crystal panel is a controllable maximum transmittance.

In a luminance control method according to the fifth aspect of the present invention, as set forth in any one of the first to the fourth aspects, one state of the plurality of states is a state where the backlight has a controllable maximum luminance and another state of the plurality of states is a state where the backlight has a controllable minimum luminance.

A liquid crystal display device according to the sixth aspect of the present invention is a liquid crystal display device, which comprises a liquid crystal panel and a backlight disposed at the back of the liquid crystal panel, for controlling an input level of a video signal to be inputted to the liquid crystal panel to control the transmittance of the liquid crystal panel and provide a gray-level display, further comprising: luminance detecting means for detecting a luminance of the backlight; a storage unit for preliminarily storing information in which the luminance detected by the luminance detecting means in a plurality of states where the liquid crystal panel has a predetermined transmittance and the backlight has a different luminance is associated with a luminance of light emitted from the backlight through the liquid crystal panel; accepting means for accepting a desired luminance set value of light emitted through the liquid crystal panel in a state where the liquid crystal panel has a predetermined transmittance; calculating means for calculating a luminance to be detected by the luminance detecting means, which is to be the luminance set value accepted by the accepting means, on the basis of the information stored in the storage unit; and luminance control means for controlling the luminance of the backlight so as to be the luminance calculated by the calculating means.

In a liquid crystal display device according to the seventh aspect of the present invention, as set forth in the sixth aspect, the storage unit further stores second information on a luminance of light emitted through the liquid crystal panel in each input level, and the device further comprises: second calculating means for calculating a luminance of light emitted through the liquid crystal panel in each input level in a case of the luminance set value accepted by the accepting means on the basis of the second information; third calculating means for calculating a luminance to be set in each gray level in a case of the luminance set value accepted by the accepting means; fourth calculating means for calculating a luminance difference between the luminance to be set in each gray level calculated by the third calculating means and the luminance in each input level calculated by the second calculating means; storage means for storing an input level, which gives a minimum luminance difference calculated by the fourth calculating means, associated with a gray level; and control means for controlling the transmittance of the liquid crystal panel in a gray level associated with the input level of the video signal.

In a liquid crystal display device according to the eighth aspect of the present invention, as set forth in the sixth or the seventh aspect, the luminance detecting means has: photoelectric conversion means for converting the luminance of the backlight into an analog-type electric signal having a voltage corresponding to the luminance of the backlight; and analog-digital conversion means for converting the converted analog-type electric signal into a digital-type electric signal.

A computer program according to the ninth aspect of the present invention is a computer program for causing a computer to output control information to a liquid crystal display device comprising a liquid crystal panel and a backlight disposed at the back of the liquid crystal panel and causing the computer to control an input level of a video signal to be inputted into the liquid crystal panel to control the transmittance of the liquid crystal panel and provide a gray-level display, comprising the steps of: causing the computer to store in a storage unit a luminance of the backlight, in a plurality of states where the backlight has a different luminance, associated with a luminance of light emitted from the backlight through the liquid crystal panel; causing the computer to set a desired luminance set value of light emitted through the liquid crystal panel; causing the computer to calculate control information for controlling a luminance of the backlight, which is to be the set luminance set value, on the basis of information stored in the storage unit; and causing the computer to output the calculated control information to the liquid crystal display device.

A computer program according to the tenth aspect of the present invention, as set forth in the ninth aspect, further comprises the steps of: causing the computer to store in a storage unit second information on a luminance of light emitted through the liquid crystal panel in each input level; causing the computer to calculate a luminance of light emitted through the liquid crystal panel in each input level in a case of the inputted luminance set value on the basis of the stored second information; causing the computer to calculate a luminance to be set in each gray level in a case of the inputted luminance set value; causing the computer to calculate a luminance difference between the calculated luminance to be set in each gray level and the calculated luminance in each input level; and causing the computer to store in the storage unit an input level, which gives a minimum calculated luminance difference, associated with a gray level.

With the first aspect, the sixth aspect and the ninth aspect, the luminance detected by the luminance detecting means and the luminance of light emitted from the backlight through the liquid crystal panel are measured in each of a plurality of states where the liquid crystal panel has a predetermined transmittance and the backlight has a different luminance, and both the luminances in each state are stored associated with each other. Since the relation between the luminance of the backlight and the luminance of light emitted from the backlight through the liquid crystal panel can be obtained uniquely, the luminance of light emitted from the backlight through the liquid crystal panel can be calculated based on the luminance of the backlight detected by the luminance detecting means. A desired luminance set value of light emitted through the liquid crystal panel is then set and the luminance of the backlight to be detected by the luminance detecting means in a case of the set luminance set value is calculated to control the luminance of the backlight. Accordingly, the luminance can be controlled so as to be a desired luminance set value, differently from conventional brightness control by which the luminance can be controlled only qualitatively. Moreover, when the luminance detected by the luminance detecting means and the luminance of light emitted from the backlight through the liquid crystal panel in a plurality of states where the backlight has a different luminance are measured in the production process of the liquid crystal display device and both the luminances in each state are preliminary stored associated with each other, there is no need to measure the luminance of light emitted through the liquid crystal panel using an external photosensor after shipment, the burden imposed on the user of the liquid crystal display device is decreased, highly accurate measurement is enabled as a series of processes, and it becomes possible to control the luminance so as to be a desired luminance with a high degree of accuracy. Furthermore, since quantitative luminance setting is enabled, the invention can be utilized as a self-diagnosis function such as notification to the user of the present luminance or notification to the user of a fact that the luminance falls below a predetermined luminance, when it occurs.

With the second aspect, the seventh aspect and the tenth aspect, the luminance of light emitted through the liquid crystal panel in each input level is measured and the measured luminance is stored associated with an input level which gives the luminance. In this manner, an actual gray-level characteristic of the liquid crystal panel can be obtained. The luminance of light emitted through the liquid crystal panel in each input level in a case where the luminance of light emitted through the liquid crystal panel is a luminance set value and the luminance (ideal luminance) to be set in each gray level is then calculated and an input level which gives a luminance substantially equal to the ideal luminance in each gray level is extracted. Since the input level can be set so as to give a luminance substantially equal to the ideal luminance in each gray level, it becomes possible to realize a superior gray-level characteristic.

With the third aspect, the seventh aspect and the tenth aspect, the luminance of light emitted through the liquid crystal panel in each input level is measured, each luminance of each measured input level is divided and normalized by the maximum luminance of the measured luminances, and each normalized luminance is stored associated with an input level which gives the luminance. In this manner, it is possible to obtain an actual gray-level characteristic of the liquid crystal panel. The luminance of light emitted through the liquid crystal panel in each input level in a case where the luminance of light emitted through the liquid crystal panel is the luminance set value and a luminance (ideal luminance) to be set in each gray level is then calculated and an input level which gives a luminance substantially equal to the ideal luminance in each gray level is extracted. Since the input level can be set so as to give a luminance substantially equal to the ideal luminance in each gray level, it is possible to realize a superior gray-level characteristic.

Moreover, regarding the above measurement of the luminance of light emitted through the liquid crystal panel, when the luminance in a predetermined wavelength band and the luminance in a plurality of wavelength bands in the predetermined wavelength band are measured, the input level for each wavelength band can be set individually so as to give a luminance substantially equal to the ideal luminance in each gray level. Since luminance control can be performed individually even when each wavelength band has a different gray-level characteristic, a superior gray-level characteristic can be realized. For example, by measuring the luminance of a wavelength band corresponding to visible light as the predetermined wavelength band and measuring the luminances of wavelength bands corresponding to the three primary colors as a plurality of wavelength bands, input level can be set individually for the three primary colors so as to give a luminance substantially equal to the ideal luminance in each gray level. Though the wavelength distribution of light emitted from the backlight might change generally due to aged deterioration, a gray-level characteristic having superior color reproducibility and superior white balance can be realized since luminance control can be performed individually for the three primary colors.

With the fourth aspect, by making a luminance in a state where the transmittance of the liquid crystal panel is a controllable maximum transmittance a luminance set value, the maximum luminance of light emitted through the liquid crystal panel can be set quantitatively.

With the fifth aspect, by increasing the luminance difference between a plurality of states of different luminance of the backlight, the relation between the luminance of the backlight and the luminance of light emitted from the backlight through the liquid crystal panel can be obtained with a high degree of accuracy.

With the eighth aspect, conversion of the luminance of the backlight into an analog-type electric signal having a voltage corresponding to the luminance of the backlight is performed by the photoelectric conversion means and the converted analog-type electric signal is converted into a digital-type electric signal by the analog-digital conversion means. Accordingly, the luminance detecting means can be constructed at low cost using general-purpose photoelectric conversion means and analog-digital conversion means.

With the present invention, since the relation between the luminance of the backlight and the luminance of light emitted from the backlight through the liquid crystal panel can be obtained uniquely and the luminance of light emitted from the backlight through the liquid crystal panel can be uniquely calculated based on the luminance of the backlight, the luminance of the backlight can be controlled and the luminance can be set quantitatively.

Moreover, with the present invention, since an actual gray-level characteristic of the liquid crystal panel can be obtained, a gray-level characteristic to be set can be calculated and both the gray-level characteristics are compared to control the luminance, and a superior gray-level characteristic can be realized.

Furthermore, with the present invention, when the luminance of the backlight (luminance detected by the luminance detecting means) and the luminance of light emitted from the backlight through the liquid crystal panel are measured in the production process of the liquid crystal display device, since there is no need to measure the luminance of light emitted through the liquid crystal panel using an external photosensor after shipment, the burden imposed on the user of the liquid crystal display device is decreased, highly accurate measurement is enabled as a series of processes, and it becomes possible to control the luminance so as to be a desired luminance with a high degree of accuracy. Moreover, even when the gray-level characteristic does not change relatively to a change in the maximum luminance, a desired gray-level characteristic can be realized with a high degree of accuracy without using an external photosensor.

BRIEF DESCRIPTION OF THE DRAWINGS

FIG. 2 is a diagram showing an input-output characteristic of a source driver;

FIG. 8 is a table view composed of a luminance level and the maximum luminance $L_{TMAX}$;

FIG. 14 is a concept view showing an example of the content of an LUT;

FIG. 15 is an explanatory view showing each pixel level before and after luminance control using the LUT;

EXPLANATION OF REFERENCE NUMERALS

| | |
|---|---|
| 1, 31 | Liquid crystal display device |
| 2 | Control unit |
| 3 | ROM |
| 4 | RAM |
| 5 | Operation unit |
| 6, 36 | Storage unit |
| 6a, 36a, 36b, 36c | LUT |
| 7 | Signal input unit |
| 8 | Liquid crystal drive circuit |
| 9 | Liquid crystal panel |
| 10 | Backlight power supply circuit |
| 11 | Backlight |
| 12 | Photosensor |
| 13 | ADC |
| 22, 42 | External photosensor |

DETAILED DESCRIPTION OF THE INVENTION

The following description will explain the present invention in detail with reference to the drawings illustrating some embodiments thereof.

Embodiment 1

Figure 1:
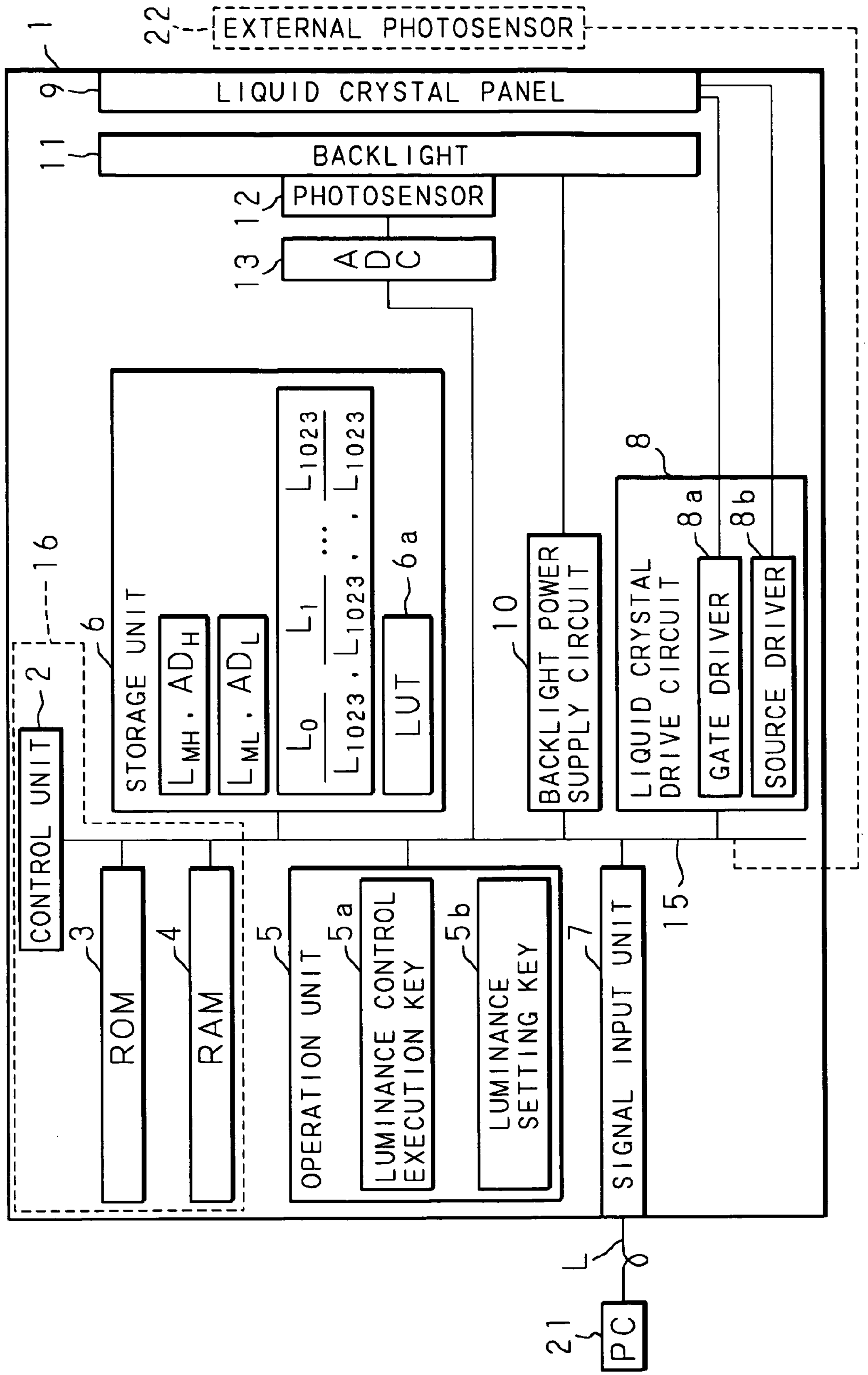
FIG. 1 is a block diagram showing a structure example of a liquid crystal display device according to Embodiment 1 of the present invention.

FIG. 1 is a block diagram showing a structure example of a liquid crystal display device according to Embodiment 1 of the present invention. The liquid crystal display device 1 according to this embodiment comprises a control unit 2, a ROM 3, a RAM 4, an operation unit 5, a storage unit 6, a signal input unit 7, a liquid crystal drive circuit 8, a liquid crystal panel 9, a backlight power supply circuit 10, a backlight 11, a photosensor 12, and an ADC (A/D converter) 13. The liquid crystal display device 1 has a function of displaying a screen image on a display screen of the liquid crystal panel 9 on the basis of a video signal inputted through the signal input unit 7. Though the video signal might be of an analog type, the following description will explain a digital-type video signal. It should be noted that an external photosensor 22 is a device for measuring the luminance of light emitted through the liquid crystal panel 9, and is additionally used when the following first process procedure is performed.

The control unit 2, which is specifically composed of a CPU connected with each hardware unit mentioned above through a bus 15, controls each hardware unit and performs a variety of software functions according to a control program stored in the ROM 3. The ROM 3 preliminarily stores a variety of software programs necessary for operations of the liquid crystal device as mentioned above. The RAM 4, which is composed of a SRAM, stores temporal data which is generated when the software is executed. It should be noted that the control unit 2, the ROM 3, the RAM 4 and the like may be realized by an electronic circuit 16 such as a microcomputer so as to a execute a variety of processes as hardware.

The operation unit 5 comprises various function keys for operating the liquid crystal display device 1. The function keys include a luminance control execution key **5*a* for setting whether a luminance control process is to be performed or not and a luminance setting key 5*b* for setting the luminance of the liquid crystal display device. It should be noted that an On Screen Display (OSD) may be displayed on the liquid crystal panel 9 so as to operate various settings of the liquid crystal display device, or the liquid crystal panel 9 may be of a touch panel type so that a part of, or all of, various function keys of the operation unit 5** can be substituted.

The storage unit 6, which is a device rewritable as software, stores: an output value $AD_H$ of the ADC 13 and a luminance $L_{MH}$ of a substantially center part of the display surface of the liquid crystal panel 9 obtained when the brightness is the maximum (100%); an output value $AD_L$ of the ADC 13 and a luminance $L_{ML}$ of a substantially center part of the display surface of the liquid crystal panel obtained when the brightness is the minimum (0%); and luminance $L_0/L_{1023}$, $L_1/L_{1023}$, . . . , $L_{1023}/L_{1023}$ which is obtained by normalizing the luminance $L_0, L_1, \ldots, L_{1023}$ of a substantially center part of the display surface obtained when a source driver (mentioned later) outputs an output voltage for each input level (e.g. 10 bit: 0~1023) to the liquid crystal panel. The storage unit 6 further has a function of timely updating and storing an LUT 6*a* in which a gray level is associated with an input level to the liquid crystal panel corresponding to the gray level. The content of the LUT 6*a* is the same as the conventional LUT illustrated in FIG. 14.

The signal input unit 7, which is connected to an external PC 21 through a video signal line L, receives a video signal outputted from the PC 21, and the control unit 2 corrects the received video signal on the basis of the LUT 6*a* stored in the storage unit 6 and outputs it to the liquid crystal drive circuit 8. The liquid crystal drive circuit 8, which is composed chiefly of a gate driver 8*a* and a source driver 8*b*, drives the liquid crystal panel 9 on the basis of a video signal (corrected signal) inputted from the control unit 2. In this manner, the control unit 2 can control the transmittance of the liquid crystal panel 9 in a gray level associated with an input level of the video signal outputted from the PC 21.

Supplied to the source driver 8*b*, which has an input-output characteristic shown in FIG. 2, is a reference voltage (when 10 bit: VREF1, VREF2, . . . , VREF10), and the source driver 8*b* has a function of generating an output voltage according to an input level inputted from the control unit 2 and outputting it in each output stage. That is, the source driver 8*b* outputs the output voltage (data voltage) $V_0, V_1, \ldots, V_{1023}$ to a source line of the liquid crystal panel according to the inputted input level 0, 1, . . . , 1023 in each output stage so as to supply data voltage.

The liquid crystal panel 9 is constructed by disposing a pair of glass substrates opposite to each other and forming a liquid crystal layer made of liquid crystal materials in a gap between them. A plurality of pixel electrodes and a TFT whose drain is connected to the respective pixel electrodes are formed on one glass substrate and a common electrode is formed on the other glass substrate. The gate and the source of the TFT are connected sequentially with each output stage of the gate driver 8*a* and the source driver 8*b*, respectively. The liquid crystal panel 9 is fitted between a pair of polarizing plates, and the backlight 11 is disposed at the back thereof.

The backlight power supply circuit 10 has a function of controlling an output voltage thereof and functions as luminance control means for controlling the luminance of light emitted from the backlight 11 by outputting a controlled voltage to the backlight 11. The liquid crystal panel 9 controls the light transmittance determined by an electrooptical characteristic of a liquid crystal material and displays a screen image by controlling On/Off of each pixel by a gate signal inputted from the gate driver 8*a* and by applying an output voltage (data voltage) inputted from the source driver 8*b* to each pixel during the On period.

Disposed near the backlight 11 is a general purpose photosensor 12, such as a photodiode or a phototransistor, which converts incident light from the backlight 11 into an analog-type electric signal (which will be hereinafter referred to as an analog signal) having a voltage according to the luminance (e.g. the luminance in the wavelength band of the visible light) of the incident light. The ADC 13 converts the analog signal outputted from the photosensor 12 into a digital-type electric signal (which will be hereinafter referred to as a digital signal). That is, the photosensor 12 and the ADC 13 cooperate to function as luminance detecting means according to the present invention.

Now, the following description will explain a luminance control method for a liquid crystal display device according to the present invention, using a flow chart. The luminance control method for a liquid crystal display device according to the present invention includes a first process procedure, which uses an external photosensor 22, and a second process procedure, which does not use the external photosensor 22. It should be noted that the first process procedure is generally processed by a manufacturer of the liquid crystal device, i.e. processed in manufacturing process, and the second process procedure is processed by the user of the liquid crystal display device.

Figure 3:
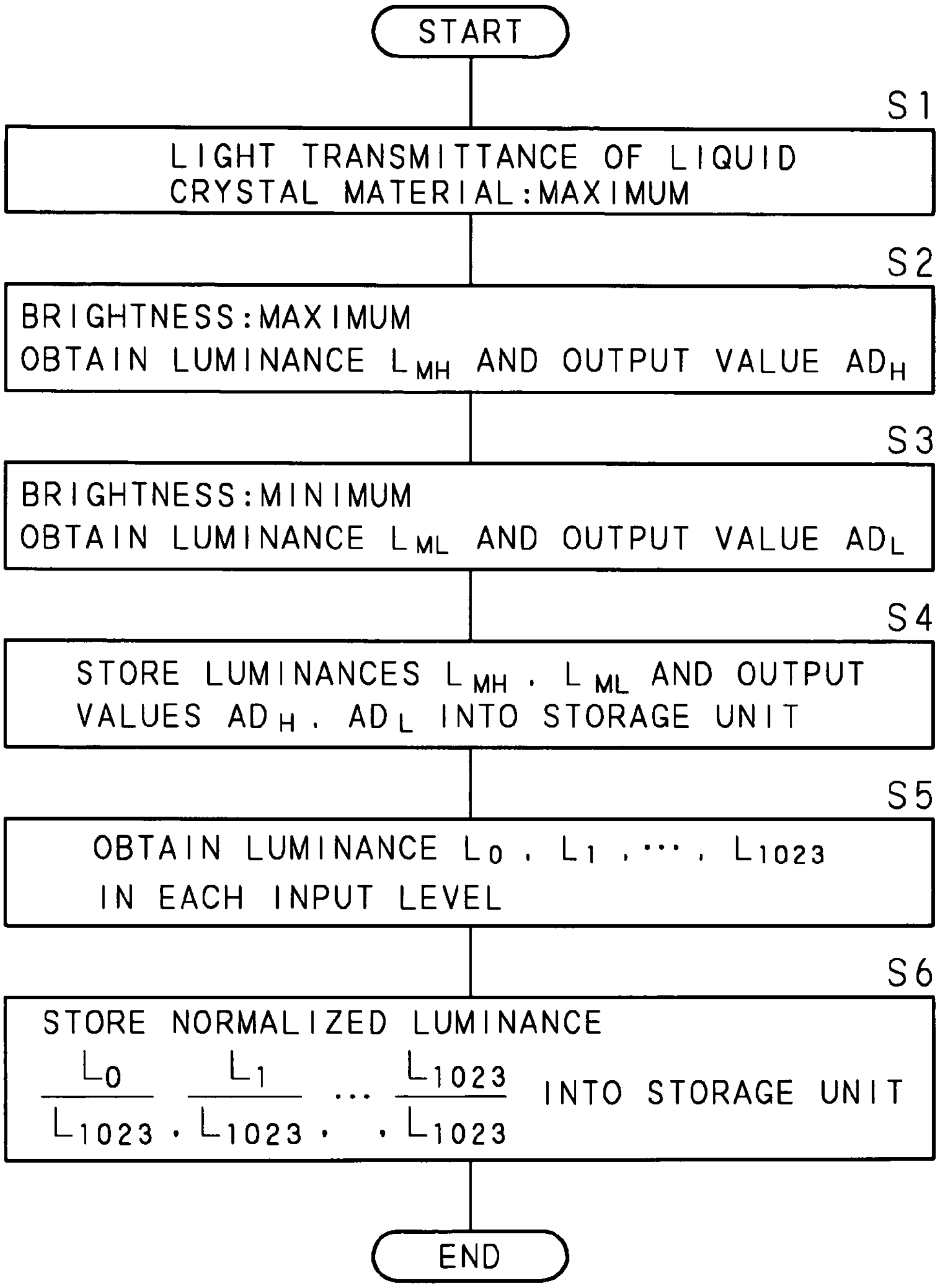
FIG. 3 is a flow chart showing an example of a first process procedure of a luminance control method for a liquid crystal display device according to Embodiment 1 of the present invention.

FIG. 3 is a flow chart showing an example of the first process procedure of the luminance control method for a liquid crystal display device according to Embodiment 1 of the present invention.

First, the control unit 2 controls the liquid crystal drive circuit 8 to give the maximum light transmittance of the liquid crystal material (step S1). In particular, when the liquid crystal panel 9 is in a normally black mode, the control unit 2 outputs a scanning signal to the gate driver 8*a* and outputs to the source driver 8*b* an input level (e.g. "1111111111(1023)" in a case of 10-bit input) which gives the maximum voltage to be applied to the liquid crystal material. The gate driver 8*a* outputs a scanning voltage for controlling On/Off of the TFT sequentially to each output stage in synchronization with the scanning signal inputted from the control unit 2 so as to supply the scanning voltage to the gate line of the liquid crystal panel. The source driver 8*b* outputs an output voltage (data voltage) $V_{1023}$ corresponding to the inputted input level (1023) to each output stage and to the source line of the liquid crystal panel. In this manner, each TFT applies the data voltage $V_{1023}$ to a pixel electrode and controls the light transmittance of the liquid crystal material determined by the electrooptical characteristic. It should be noted that, when the liquid crystal panel 9 is in a normally white mode, the light transmittance of the liquid crystal material can be maximum by outputting to the source driver 8*b* an input level (e.g. "0000000000(0)" in a case of 10-bit input) which gives the minimum voltage to be applied to the liquid crystal material. A signal of an input level which gives the maximum light transmittance of the liquid crystal material may be inputted externally from a PC or the like.

The control unit 2 then controls the backlight power supply circuit 10 to give the maximum brightness value (100%), obtains a luminance $L_{MH}$ of a substantially center part of the display surface of the liquid crystal panel 9 with the external photosensor 22 and obtains an output value $AD_H$ of the ADC 13 (step S2). Similarly, the control unit 2 controls the backlight power supply circuit 10 to give the minimum brightness value (0%), obtains a luminance $L_{ML}$ of a substantially center part of the display surface of the liquid crystal panel 9 and obtains an output value $AD_L$ of the ADC 13 (step S3). It should be noted that the brightness control can be performed by controlling the voltage value to be supplied to the backlight.

Figure 4:
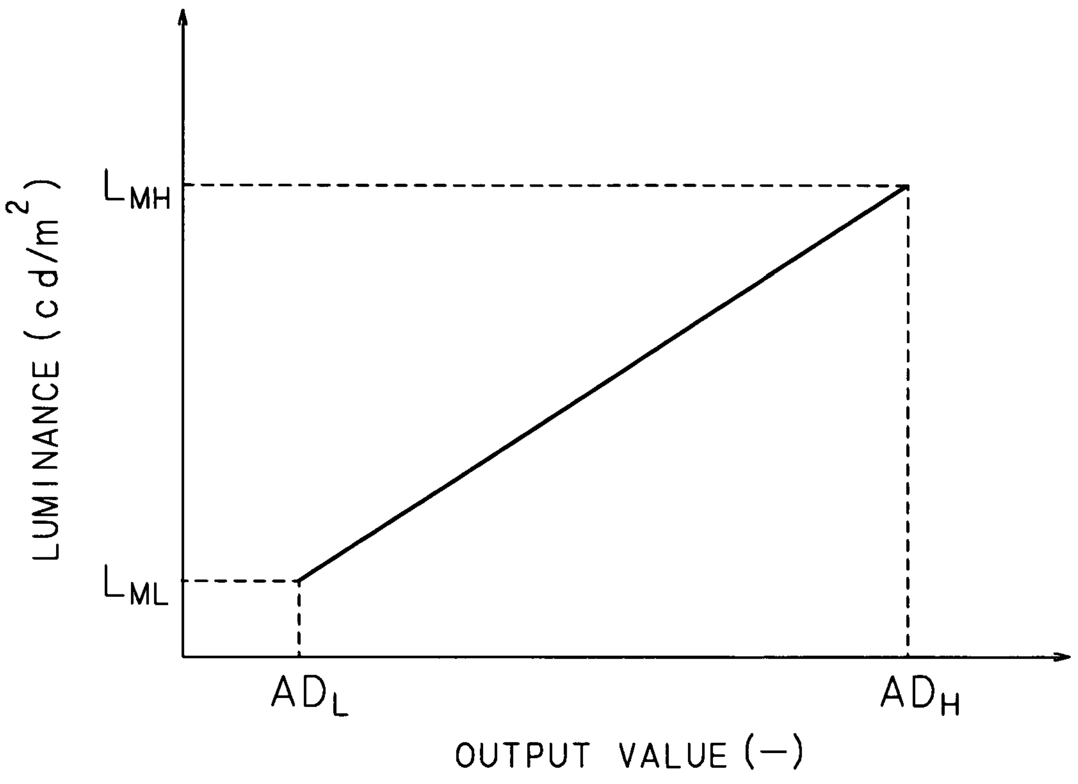
FIG. 4 is a graph showing a luminance-output value characteristic.

The control unit 2 stores in the storage unit 6 the luminances $L_{MH}$, $L_{ML}$ and the output values $AD_H$, $AD_L$ obtained in the steps S2 and S3 (step S4). Since the luminance L is proportional to the output value AD, a luminance-output value characteristic as shown in FIG. 4 can be obtained uniquely by obtaining two points of brightness, namely 100% and 0%, and the luminance L can be calculated (interpolated) based on an expression (3) from the output value AD of the ADC 13, the luminances $L_{MH}$, $L_{ML}$ and the output values $AD_H$, $AD_L$, without using the external photosensor 22. That is, the output value AD of the ADC 13, which gives the luminance L, can be calculated based on an expression (4). It should be noted that, though two points of 100% and 0% of the brightness are obtained in this example to determine the luminance-output value characteristic, the present invention is not limited to this, and the luminances and the output values of two arbitrary points of the different brightness may be obtained and the obtained luminances and output values may be stored in the storage unit 6 to obtain the luminance-output value characteristic by forward extrapolation or backward extrapolation, or the luminances and the output values of more than two arbitrary points of the different brightness may be obtained and linearization may be applied to obtain the luminance-output value characteristic.

$$L = L_{MH} + \frac{L_{MH} - L_{ML}}{AD_H - AD_L}(AD - AD_H) \quad \text{expression (3)}$$

$$AD = AD_H + \frac{AD_H - AD_L}{L_{MH} - L_{ML}}(L - L_{MH}) \quad \text{expression (4)}$$

Figure 5:
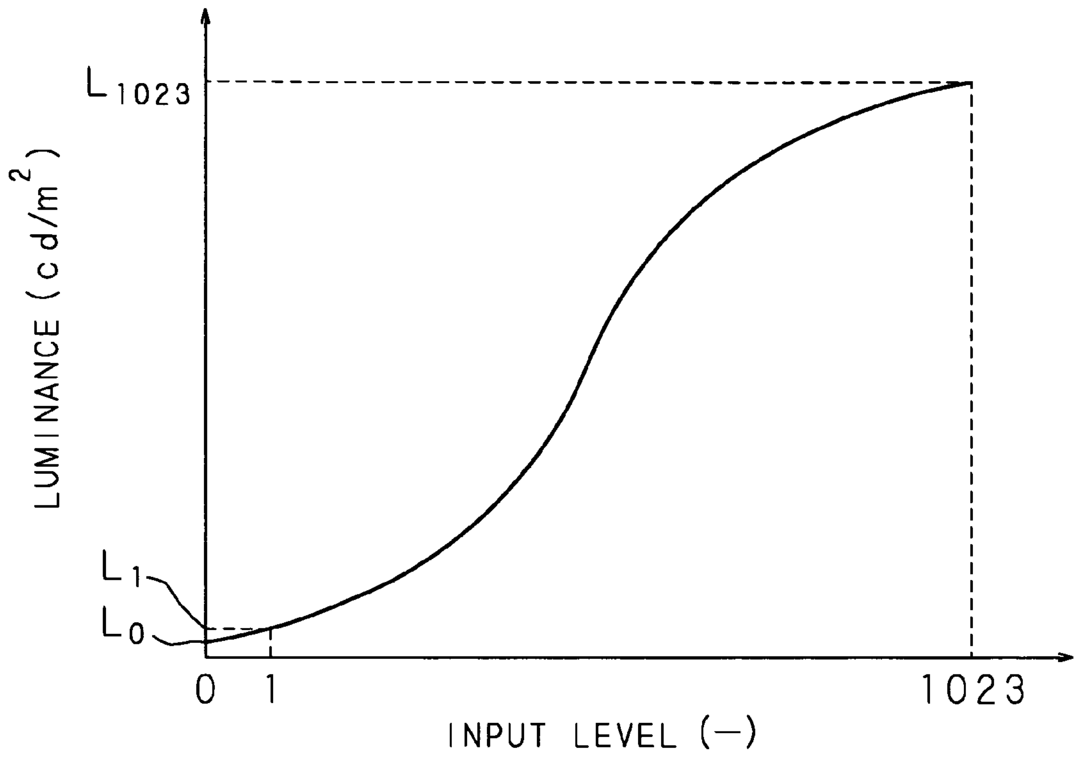
FIG. 5 is a graph showing an actual gray-level characteristic of the liquid crystal panel.
Figure 6:
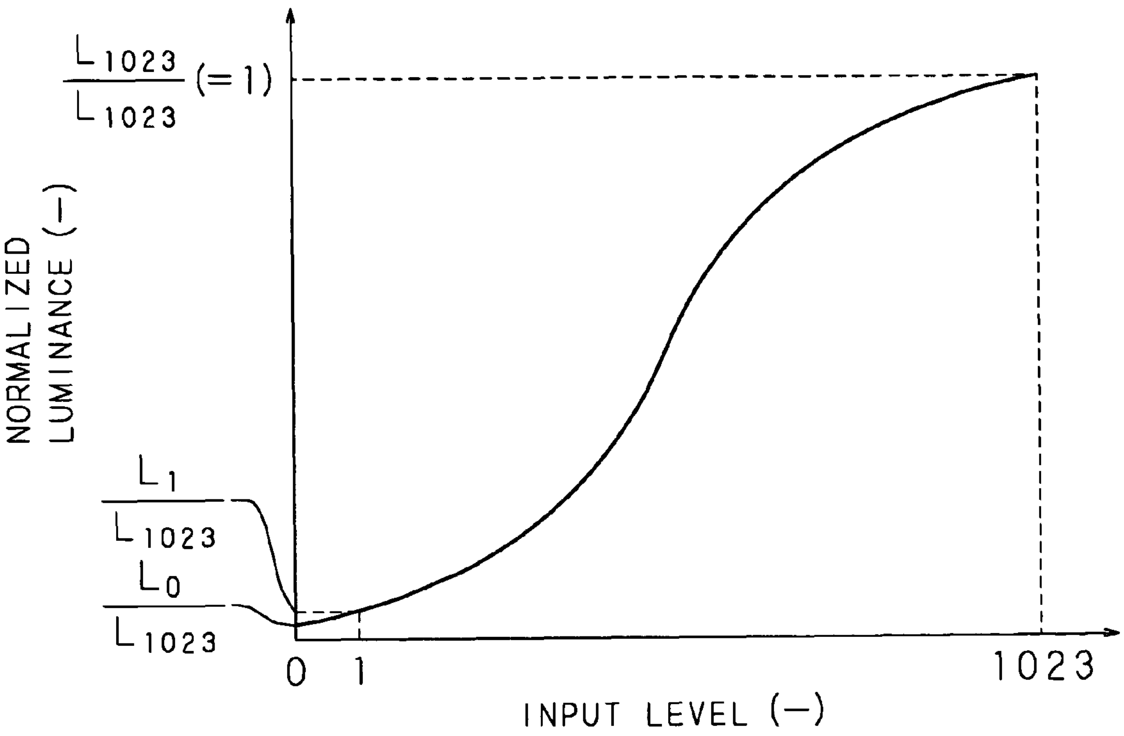
FIG. 6 is a graph showing a normalized gray-scale characteristic of the liquid crystal panel.

The control unit 2 then outputs to the source driver 8*b* a signal, which gives the input level of 0, 1, . . . , 1023, to output the output voltage $V_0, V_1, \ldots, V_{1023}$ to the liquid crystal panel 9 and change the light transmittance of the liquid crystal material, and obtains the luminance $L_0, L_1, \ldots, L_{1023}$ of a substantially center part of the liquid crystal panel 9 in each case with the external photosensor 22 (step S5). In this manner, an actual gray-level characteristic of the liquid crystal panel 9 as shown in FIG. 5 can be obtained. A signal which gives the input level of 0, 1, . . . , 1023 may be inputted externally from a PC or the like.

The obtained luminance $L_0, L_1, \ldots, L_{1023}$ is then normalized by dividing it by the maximum luminance $L_{1023}$ and the normalized luminance $L_0/L_{1023}, L_1/L_{1023}, \ldots, L_{1023}/L_{1023}$ is stored in the storage unit 6 (step S6). In this manner, a normalized gray-level characteristic of the liquid crystal panel 9 as shown in FIG. 8 can be obtained. It is needless to say that an actual gray-level characteristic obtained in the step S5 may be stored in the storage unit 6 instead of the normalized gray-level characteristic, and there is no limitation as long as a correlation between luminances for respective input levels inputted to the source driver is defined. Furthermore, 256 points of the luminance to give input levels of 0, 4, 8, . . . , 1023, for example, of the input levels of 0, 1, . . . , 1023 may be measured, and the luminance of 1024 points may be calculated by linear interpolation, normalized and then stored in the storage unit 6. In this manner, reduction of process time can be realized. It is needless to say that the 256 points of input levels to be measured actually may be arbitrary, and the number of the levels to be measured actually is not limited to 256.

Figure 7:
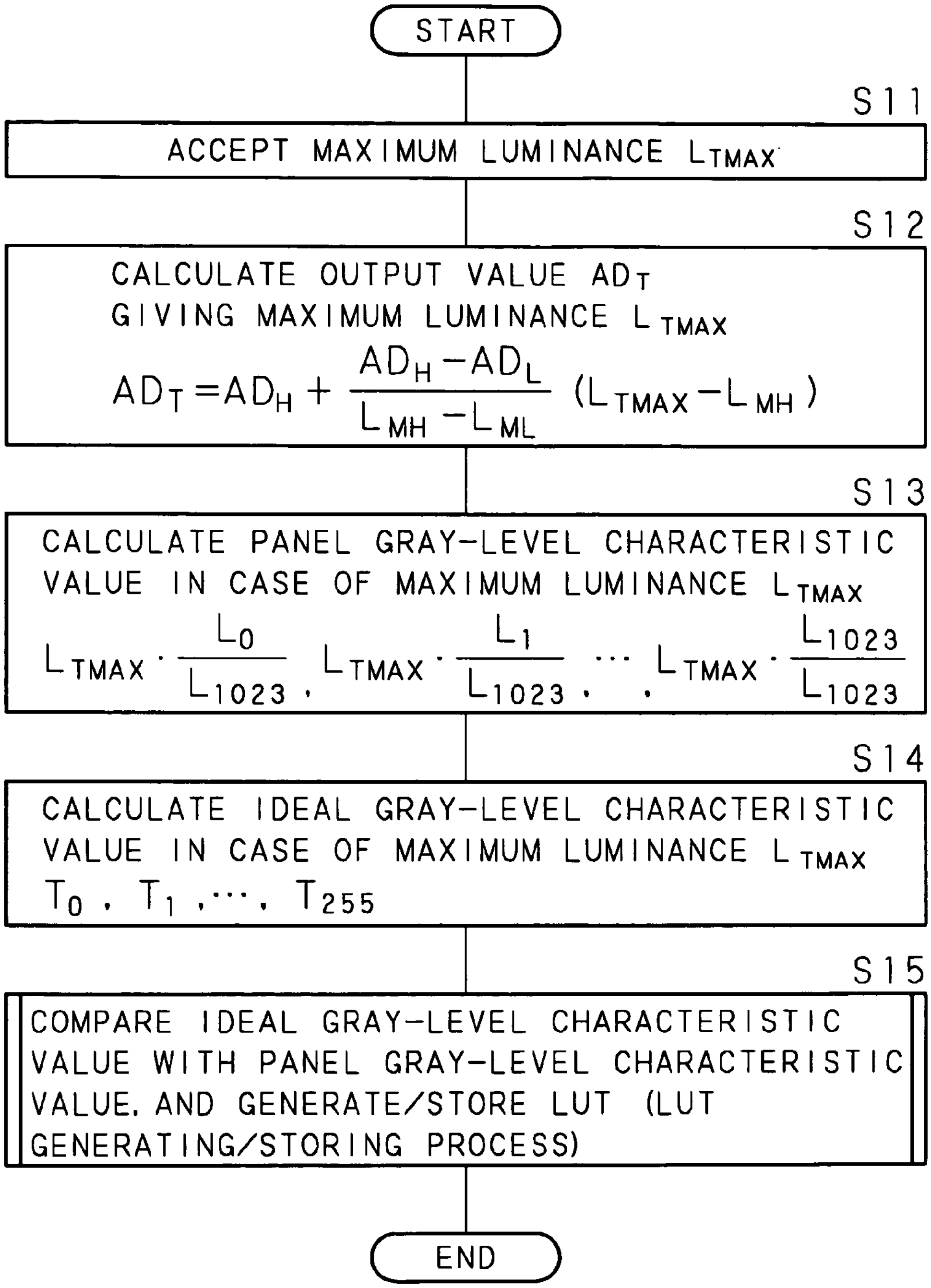
FIG. 7 is a flow chart showing an example of a second process procedure of a luminance control method for a liquid crystal display device according to Embodiment 1 of the present invention.

FIG. 7 is a flow chart showing an example of the second process procedure of the luminance control method for a liquid crystal display device according to Embodiment 1 of the present invention.

First, an input of a desired luminance set value (which will be hereinafter referred to as the maximum luminance $L_{TMAX}$) by a user of the liquid crystal display device 1 is accepted through the operation unit 5 (step S11). It should be noted that the maximum luminance $L_{TMAX}$ may be inputted directly as a value itself, or accepted in a manner that a table in which a luminance level is associated with the maximum luminance $L_{TMAX}$ as shown in FIG. 8 is stored in the storage unit 6 and the user selects a luminance level after reading the table in a suitable manner.

The control unit 2 reads the luminances $L_{MH}$, $L_{ML}$ and the output values $AD_H$, $AD_L$ stored in the storage unit 6 and calculates an output value $AD_T$ which gives the maximum luminance $L_{TMAX}$ based on the expression (4) from the read luminances $L_{MH}$, $L_{ML}$ and output values $AD_H$, $AD_L$ and the maximum luminance $L_{TMAX}$ accepted in the step S11 (step S12). In this manner, the luminance of the display screen of the liquid crystal panel can be controlled so as to be the maximum luminance $L_{TMAX}$ by controlling the backlight power supply circuit 10 so as to give the output value $AD_T$.

The control unit 2 then reads the normalized luminance $L_0/L_{1023}, L_1/L_{1023}, \ldots, L_{1023}/L_{1023}$ stored in the storage unit 6 and multiplies the read luminance $L_0/L_{1023}, L_1/L_{1023}, \ldots, L_{1023}/L_{1023}$ by the maximum luminance $L_{TMAX}$ accepted in the step S11 to calculate the actual luminance (which will be hereinafter referred to as a panel gray-level characteristic value) $L_{TMAX} \cdot L_0/L_{1023}, L_{TMAX} \cdot L_1/L_{1023}, \ldots, L_{TMAX} \cdot L_{1023}/L_{1023}$ in a case of the maximum luminance $L_{TMAX}$ (step S13).

The control unit 2 then calculates luminance (which will be hereinafter referred to as an ideal gray-level characteristic value) $T_0, T_1, \ldots, T_{255}$ to be set in a case of the maximum luminance $L_{TMAX}$ based on a display function preliminarily stored in the storage unit 6 (step S14). Now, the following description will explain an example where the display function is the GSDF. The GSDF defines that the minimum luminance difference of a given target identifiable by a normal man is 1 JND (Just-Noticeable Difference) under a given observation conditions, and is a function obtained by plotting JNDs up to 1023-step assuming that the minimum luminance is 0.05 cd/m$^2$.

The control unit 2 calculates $JND_{TMAX}$ and $JND_{TMIN}$ respectively for the maximum luminance $L_{TMAX}$ and minimum luminance $L_{TMIN}$ accepted in the step S11 based on an expression (5). It should be noted that the minimum luminance $L_{TMIN}$ is $L_{TMAX} \cdot L_0/L_{1023}$ so that the luminance difference between each JND (each gray level) becomes the maximum, i.e. the maximum dynamic range. It is needless to say that the minimum luminance $L_{TMIN}$ may be an arbitrary luminance of the $L_{TMAX} \cdot L_1/L_{1023}, L_{TMAX} \cdot L_2/L_{1023}, \ldots, L_{TMAX} \cdot L_{1023}/L_{1023}$, or may be obtained in a manner that input of a desired minimum luminance $L_{TMIN}$ by the user of the liquid crystal display device 1 is accepted through the operation unit 5.

$$JND = A + B\cdot\log_{10}(L) + C\cdot(\log_{10}(L))^2 + D\cdot(\log_{10}(L))^3 + E\cdot(\log_{10}(L))^4 + F\cdot(\log_{10}(L))^5 + G\cdot(\log_{10}(L))^6 + H\cdot(\log_{10}(L))^7 + I\cdot(\log_{10}(L))^8 \quad \text{expression (5)}$$

A=71.498068, B=94.593053, C=41.912053

D=9.8247004, E=0.28175407, F=−1.1878455

G=−0.18014349, H=0.14710899, I=−0.017046845

In order to allocate a resolution n (e.g. 8 bit=256) a JND difference ($JND_{TMAX} - JND_{TMIN}$) between the maximum luminance $L_{TMAX}$ and the minimum luminance $L_{TMIN}$, which is divided equally into the number of the gray levels $2^n-1$ (255 in this example), the control unit 2 calculates an ideal gray-level characteristic value $T_1, T_2, \ldots, T_{255}$ in each gray level based on an expression (6). It should be noted that, though the above description explained an example where the display function is the GSDF, it is needless to say that the display function may be any function.

$$T_i = 10L\left\{\left(\frac{JND_{TMAX} - JND_{TMIN}}{255}\right)i + JND_{TMIN}\right\} \quad \text{expression (6)}$$

i: gray level (0, 1, . . . , 255)

$$L(k) = \frac{a + c\cdot \text{Ln}(k) + e\cdot(\text{Ln}(k))^2 + g\cdot(\text{Ln}(k))^3 + q\cdot(\text{Ln}(k))^4}{1 + b\cdot\text{Ln}(k) + d\cdot(\text{Ln}(k))^2 + f\cdot(\text{Ln}(k))^3 + h\cdot(\text{Ln}(k))^4 + p\cdot(\text{Ln}(k))^5}$$

a=−1.3011877, b=−2.5840191E−2, c=8.0242636E−2
d=−1.0320229E−1, e=1.3646699E−1, f=2.8745620E−2
g=−2.5468404E−2, h=−3.1978977E−3
p=1.2992634E−4, q=1.3635334E−3

The control unit 2 then compares the ideal gray-level characteristic value $T_0, T_1, \ldots, T_{255}$ calculated in the step S14 with the panel gray-level characteristic value $L_{TMAX}\cdot L_0/L_{1023}, L_{TMAX}\cdot L_1/L_{1023}, \ldots, L_{TMAX}\cdot L_{1023}/L_{1023}$ calculated in the step S13 to generate the LUT 6*a* and stores the LUT 6*a* in the storage unit 6 (step S15).

Figure 9:
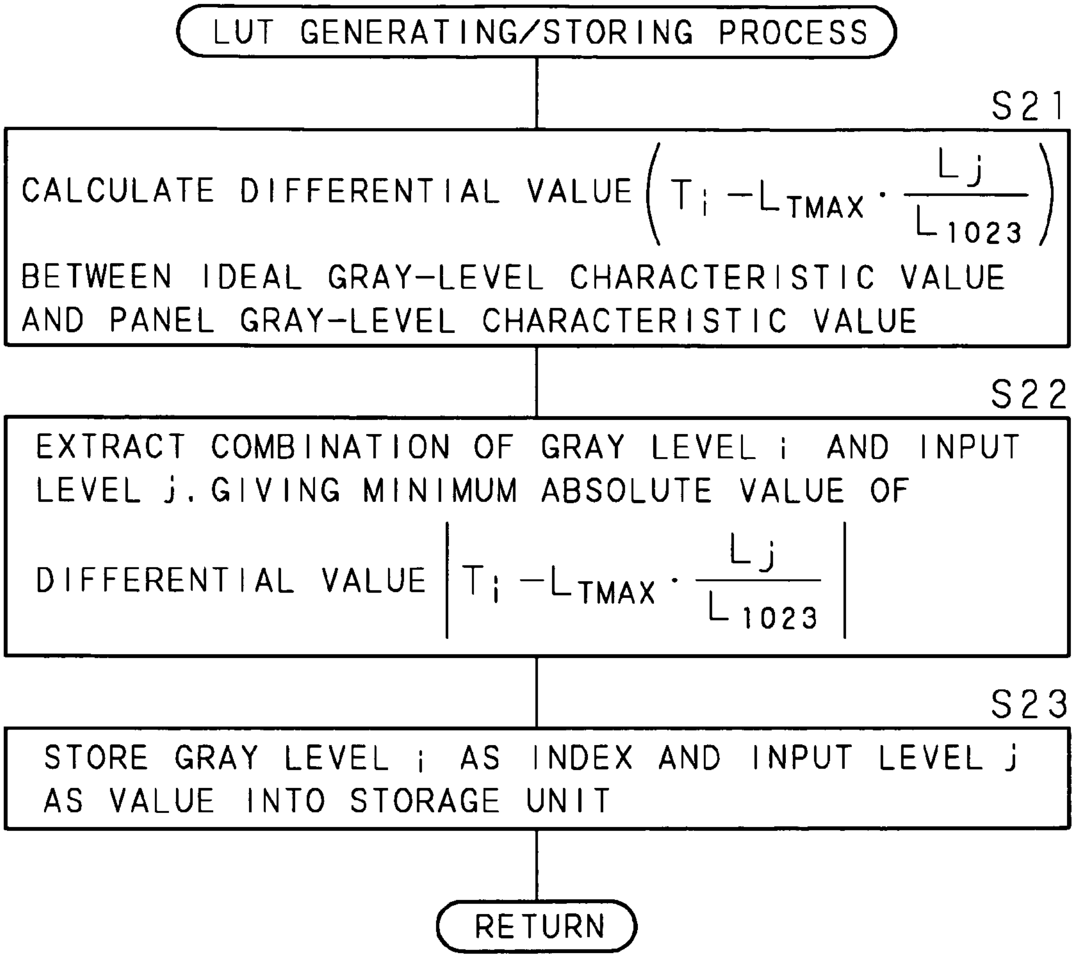
FIG. 9 is a flow chart showing an example of an LUT generating/storing process.

Now, the following description will explain the LUT generating/storing process mentioned above in the step S15 more concretely. FIG. 9 is a flow chart showing an example of the LUT generating/storing process.

The control unit 2 calculates a differential value ($T_i - L_{TMAX}\cdot L_j/L_{1023}$) between an ideal gray-level characteristic value $T_i$ (i=0, 1, . . . , 255) and a panel gray-level characteristic value $L_{TMAX}\cdot L_j/L_{1023}$ (j=0, 1, . . . , 1023) (step S21), and extracts a combination of a gray level i and an input level j, which gives the minimum absolute value of the calculated differential value $|T_i - L_{TMAX}\cdot L_j/L_{1023}|$, for each gray level i (step S22).

The calculated gray level i is then stored in the storage unit 6 as an index of the LUT 6*a* and the input level j is stored in the storage unit 6 as a value of the LUT 6*a* (step S23). It should be noted that, though described is a manner in that the LUT 6*a* is composed of a combination of a gray level i and an input level j which gives the minimum absolute value of the differential value ($T_i - L_{TMAX}\cdot L_j/L_{1023}$) in the step S22, the present invention is not limited to this, and the LUT 6*a* may be composed of a combination of a gray level i and an input level j which gives the smallest positive number (or negative number) of the differential value ($T_i - L_{TMAX}\cdot L_j/L_{1023}$).

Embodiment 2

Though described in Embodiment 1 is an embodiment suitable mainly for a monochrome liquid crystal display device which uses one LUT for luminance control, it is preferable to prepare an LUT for luminance control for each color in a case of a color liquid crystal display device since the transmittance of light in the liquid crystal material differs according to the wavelength of the light as shown in the expression (1). Such construction is described in Embodiment 2.

Figure 10:
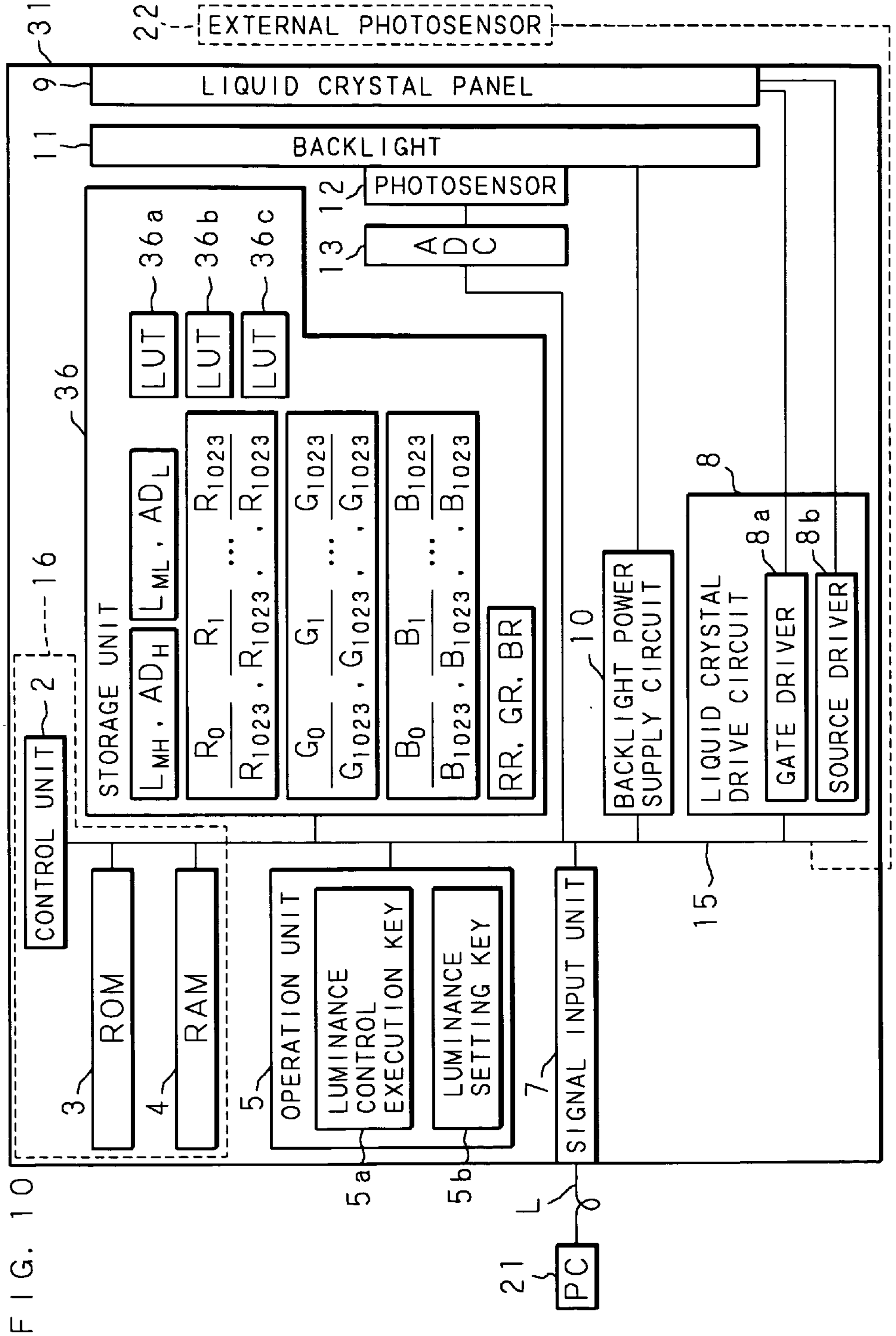
FIG. 10 is a block diagram showing a structure example of a liquid crystal display device according to Embodiment 2 of the present invention.

FIG. 10 is a block diagram showing a structure example of a liquid crystal display device according to Embodiment 2 of the present invention. A liquid crystal display device 31 according to this embodiment comprises a control unit 2, a ROM 3, a RAM 4, an operation unit 5, a storage unit 36, a signal input unit 7, a liquid crystal drive circuit 8, a liquid crystal panel 9, a backlight power supply circuit 10, a backlight 11, a photosensor 12, and an ADC 13.

The storage unit 36, which is a device rewritable as software, stores: an output value $AD_H$ of the ADC 13 and a luminance $L_{MH}$ of a substantially center part of the display surface of the liquid crystal panel 9 in a case of the maximum brightness (100%); an output value $AD_L$ of the ADC 13 and a luminance $L_{ML}$ of a substantially center part of the display surface of the liquid crystal panel 9 in a case of the minimum brightness (0%); and a first color luminance $R_0/R_{1023}, R_1/R_{1023}, \ldots, R_{1023}/R_{1023}$, a second color luminance $G_0/G_{1023}, G_1/G_{1023}, \ldots, G_{1023}/G_{1023}$, and a third color luminance $B_0/B_{1023}, B_1/B_{1023}, \ldots, B_{1023}/B_{1023}$ which are obtained by normalizing a first color luminance $R_0, R_1, \ldots, R_{1023}$, a second color luminance $G_0, G_1, \ldots, G_{1023}$, and a third color luminance $B_0, B_1, \ldots, B_{1023}$ corresponding to the three primary colors of a substantially center part of the display surface obtained when the source driver 8*b* outputs an output voltage corresponding to each input level to the liquid crystal panel 9. The storage unit 36 further has a function of timely updating and storing an LUT 36*a*, 36*b*, 36*c* for each color in which a gray level is associated with an input level to the liquid crystal panel 9 according to the gray level. The content of the LUTs 36*a*, 36*b* and 36*c* are respectively the same as the conventional LUT illustrated in FIG. 14. Since other structures are the same as those of Embodiment 1, like codes are used to refer to like parts and the explanation thereof is omitted.

It should be noted that an external photosensor 42 is a device for measuring the luminance in a wavelength band corresponding to visible light of light emitted through the liquid crystal panel 9 and the luminance in wavelength bands corresponding respectively to the three primary colors, and is additionally used when a first process procedure (mentioned later) is performed. It should be also noted that the primary three colors include a color mixing system composed of red, green and blue, and a subtractive color system composed of yellow, cyan and magenta, and any one of the color systems may be employed.

Figure 11:
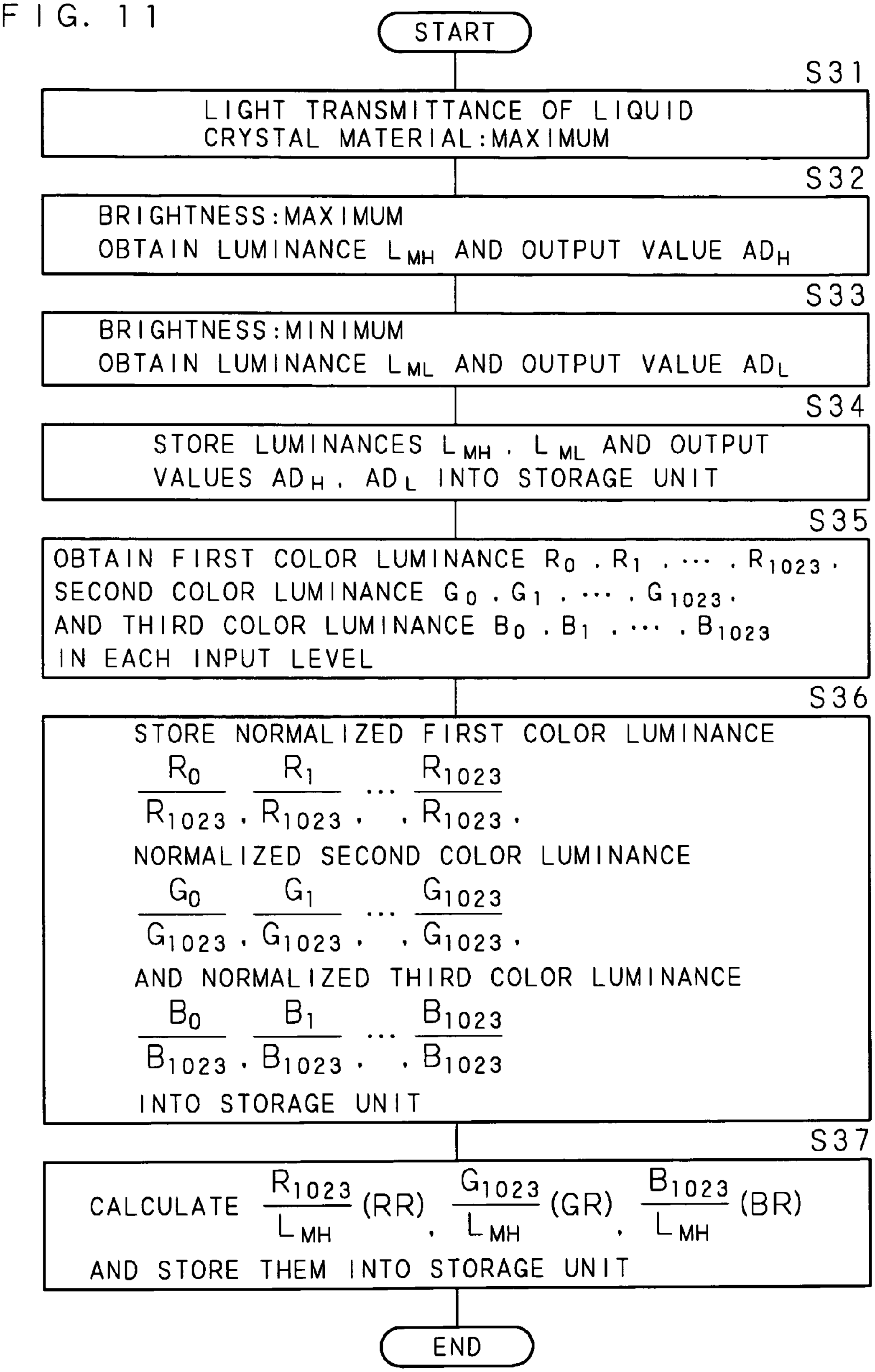
FIG. 11 is a flow chart showing an example of a first process procedure of a luminance control method for a liquid crystal display device according to Embodiment 2 of the present invention.

FIG. 11 is a flow chart showing an example of the first process procedure of a luminance control method for a liquid crystal display device according to Embodiment 2 of the present invention.

First, the control unit 2 controls the liquid crystal drive circuit 8 to give the maximum light transmittance of the liquid crystal material (input level: 1023) (step S31). The control unit 2 then controls the backlight power supply circuit 10 to give the maximum brightness value (100%), obtains a luminance $L_{MH}$ of a substantially center part of the display surface of the liquid crystal panel 9 with the external photosensor 42 and obtains an output value $AD_H$ of the ADC 13 (step S32). Similarly, the control unit 2 controls the backlight power supply circuit 10 to give the minimum brightness value (0%), obtains a luminance $L_{ML}$ of a substantially center part of the display surface of the liquid crystal panel 9 with the external photosensor 42 and obtains an output value $AD_L$ of the ADC 13 (step S33). The control unit 2 stores in the storage unit 36 the luminances $L_{MH}$, $L_{ML}$ and the output values $AD_H$, $AD_L$ obtained in the steps S32 and S33 (step S34).

The control unit 2 then outputs a signal, which gives an input level 0, 1, . . . , 1023, to the source driver 8*b*, outputs an output voltage $V_0, V_1, \ldots, V_{1023}$ to the liquid crystal panel 9 to change the light transmittance of the liquid crystal material, and obtains a first color luminance $R_0, R_1, \ldots, R_{1023}$, a second color luminance $G_0, G_1, \ldots, G_{1023}$, and a third color luminance $B_0, B_1, \ldots, B_{1023}$ of a substantially center part of the display surface of the liquid crystal panel 9 in each case with the external photosensor 42 (step S35). The obtained first color luminance $R_0, R_1, \ldots, R_{1023}$, second color luminance $G_0, G_1, \ldots, G_{1023}$, and third color luminance $B_0, B_1, \ldots, B_{1023}$ are then normalized by dividing them respectively by the maximum luminance $R_{1023}$, $G_{1023}$ and $B_{1023}$, and the normalized first color luminance $R_0/R_{1023}, R_1/R_{1023}, \ldots, R_{1023}/R_{1023}$, second color luminance $G_0/G_{1023}, G_1/G_{1023}, \ldots, G_{1023}/G_{1023}$, and third color luminance $B_0/B_{1023}, B_1/B_{1023}, \ldots, B_{1023}/B_{1023}$ are stored in the storage unit 36 (step S36). A signal which gives an input level of 0, 1, . . . , 1023 may be inputted externally from a PC or the like.

The control unit 2 then divides the first color luminance $R_{1023}$, the second color luminance $G_{1023}$ and the third color luminance $B_{1023}$ respectively by the luminance $L_{MH}$ and stores in the storage unit 36 $R_{1023}/L_{MH}$ (which will be hereinafter referred to as RR), $G_{1023}/L_{MH}$ (which will hereinafter referred to as GR) and $B_{1023}/L_{MH}$ (which will be hereinafter referred to as BR) (step S37). That is, a ratio of the luminance of the three primary colors RR:GR:BR is calculated. It should be noted that, though a ratio of the luminance is calculated in this example where the luminance liquid crystal material has the controllable maximum transmittance, a ratio of the luminance in a case where the liquid crystal material has a predetermined transmittance may be calculated.

Figure 12:
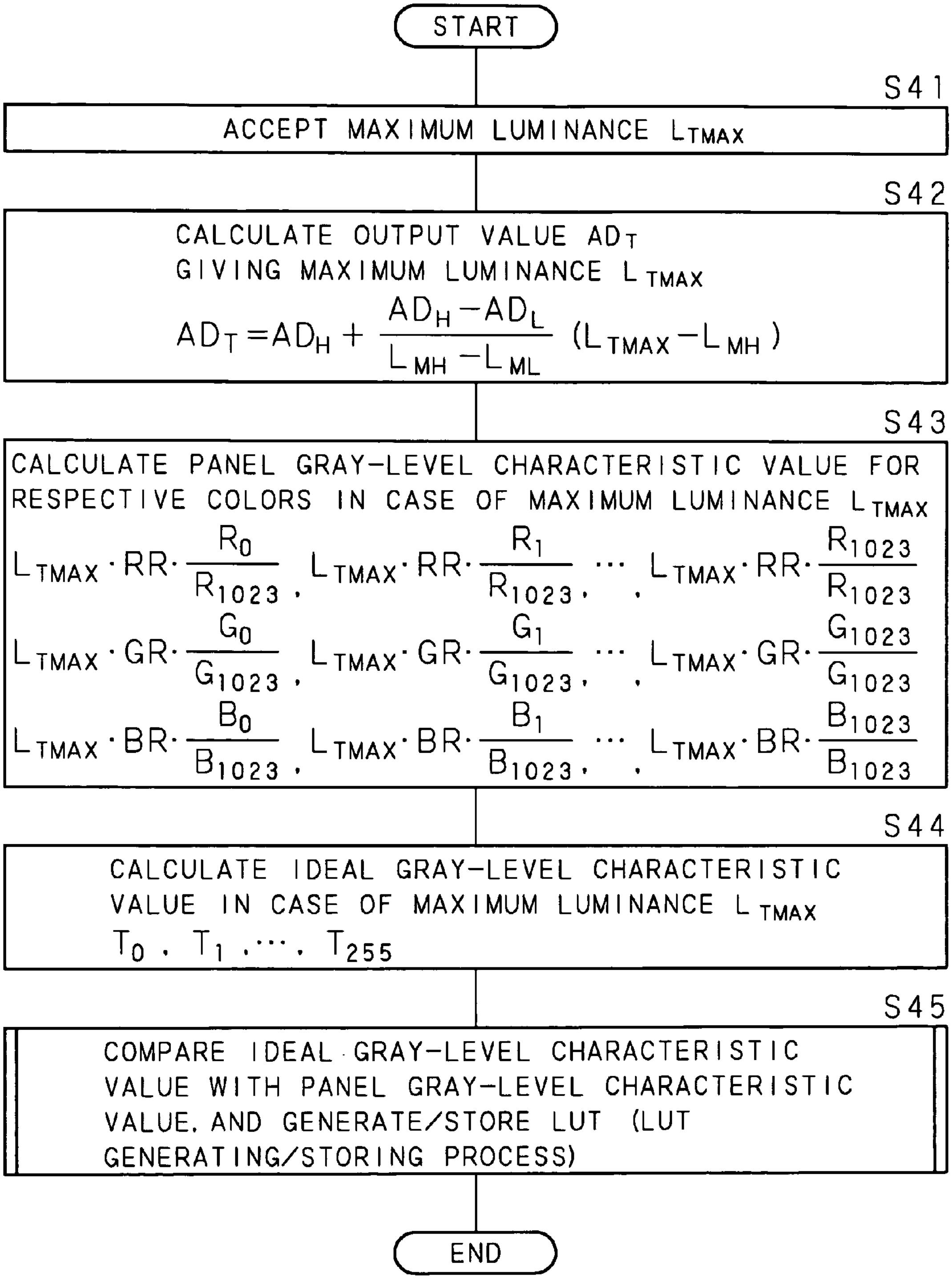
FIG. 12 is a flow chart showing an example of a second process procedure of a luminance control method for a liquid crystal display device according to Embodiment 2 of the present invention.
Figure 13:
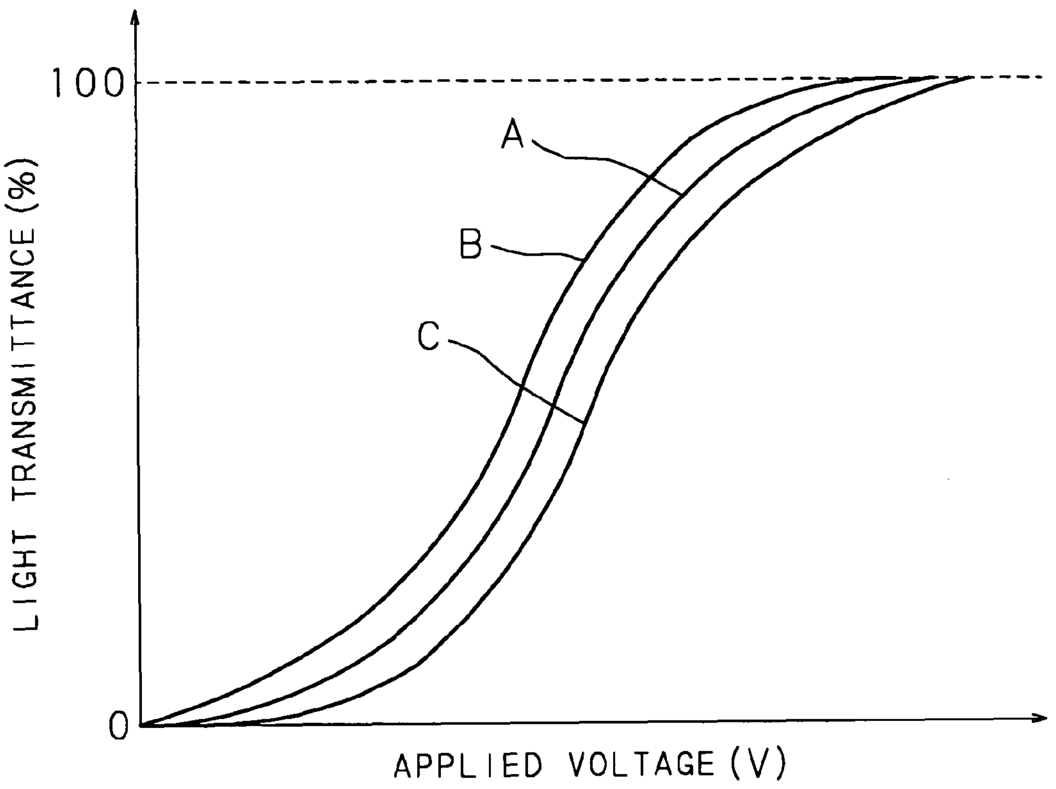
FIG. 13 is a graph showing an example of the electrooptical characteristic of a liquid crystal material.
Figure 16:
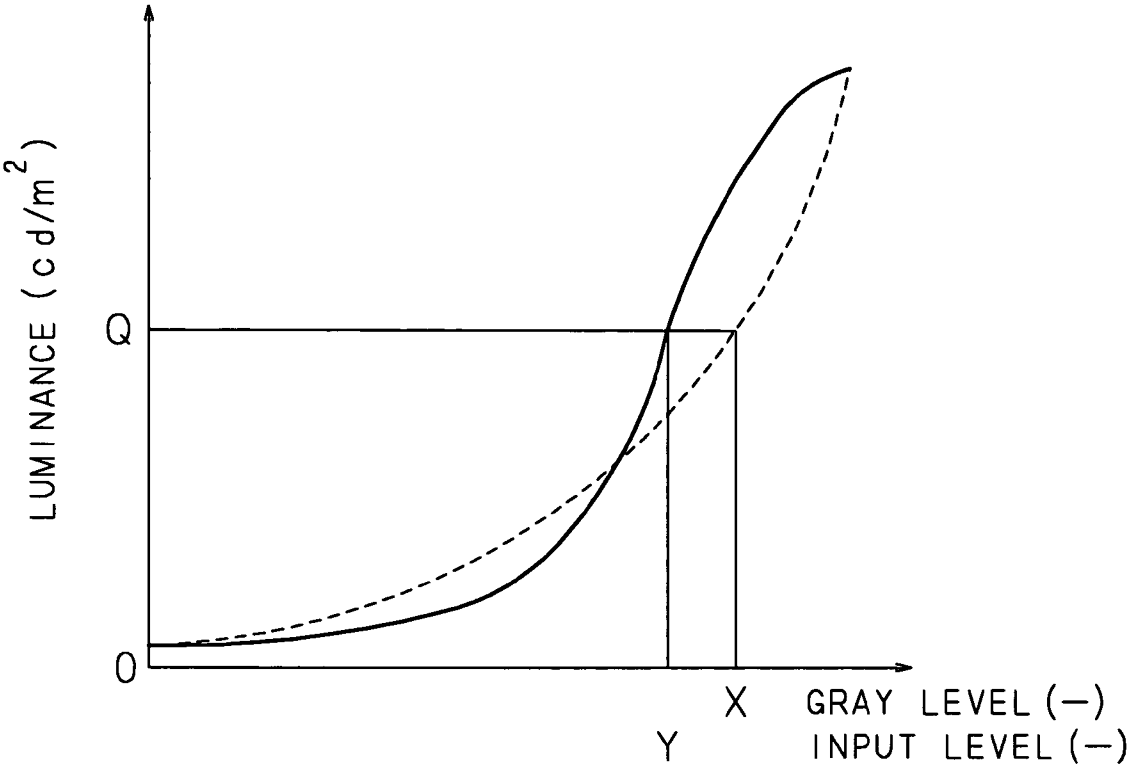
FIG. 16 is an explanatory view showing the concept of luminance control using the LUT.
Figure 17:
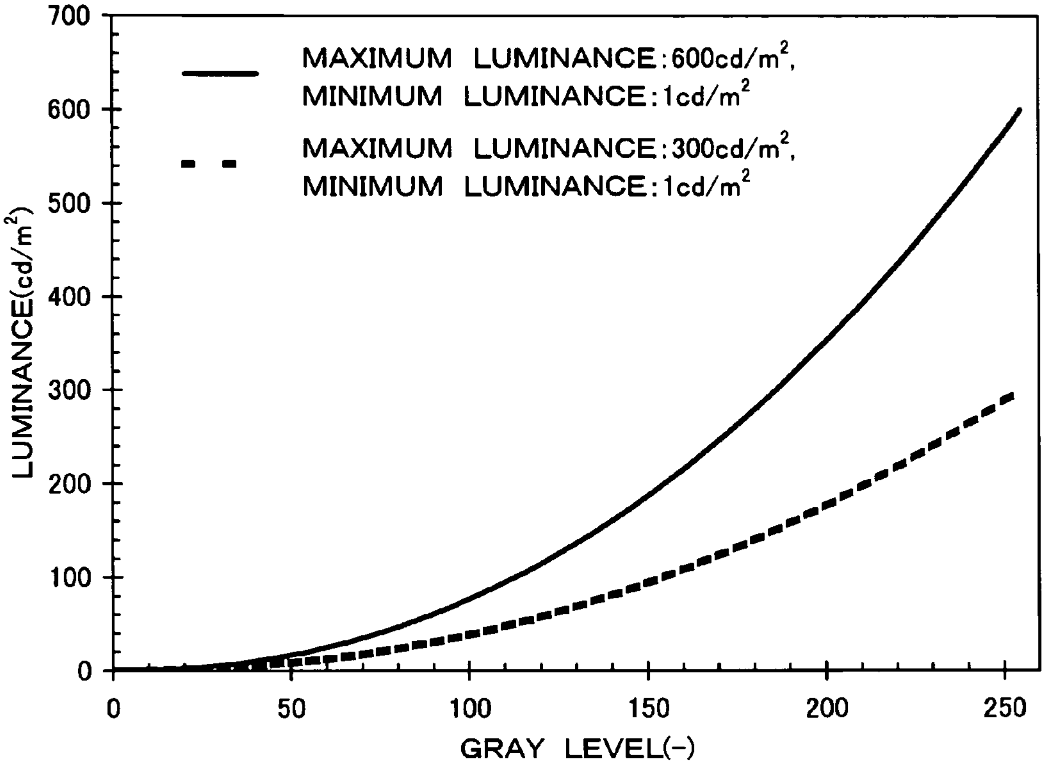
FIG. 17 is a graph showing a gamma characteristic.
Figure 18:
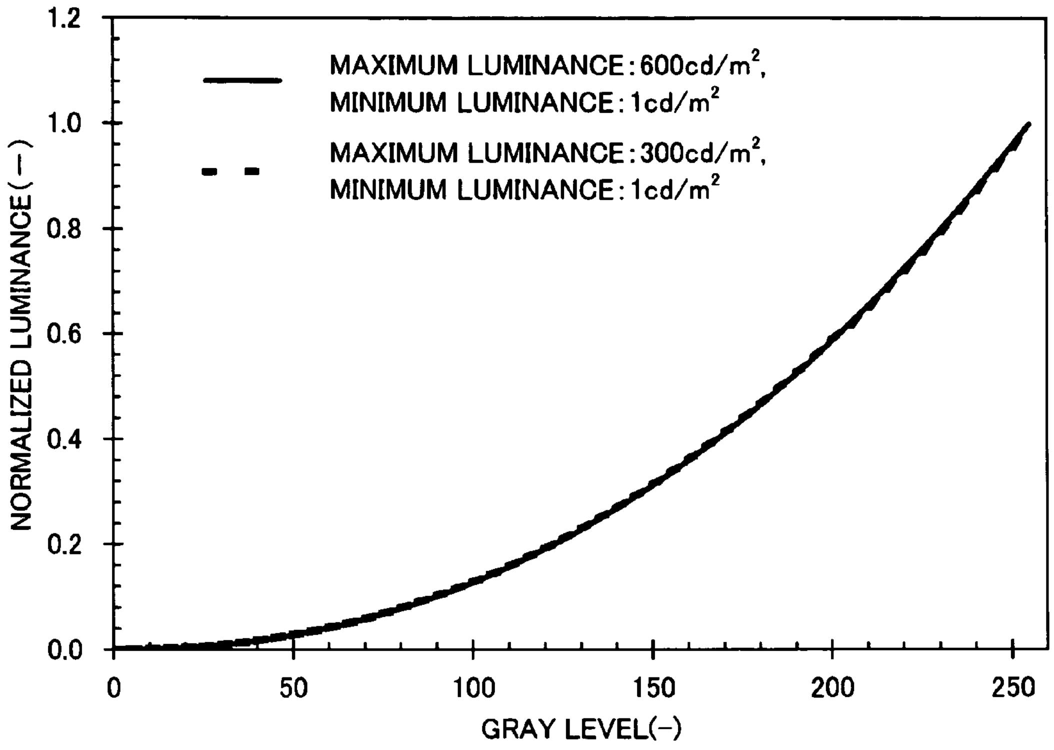
FIG. 18 is a graph of a normalized gamma characteristic.
Figure 19:
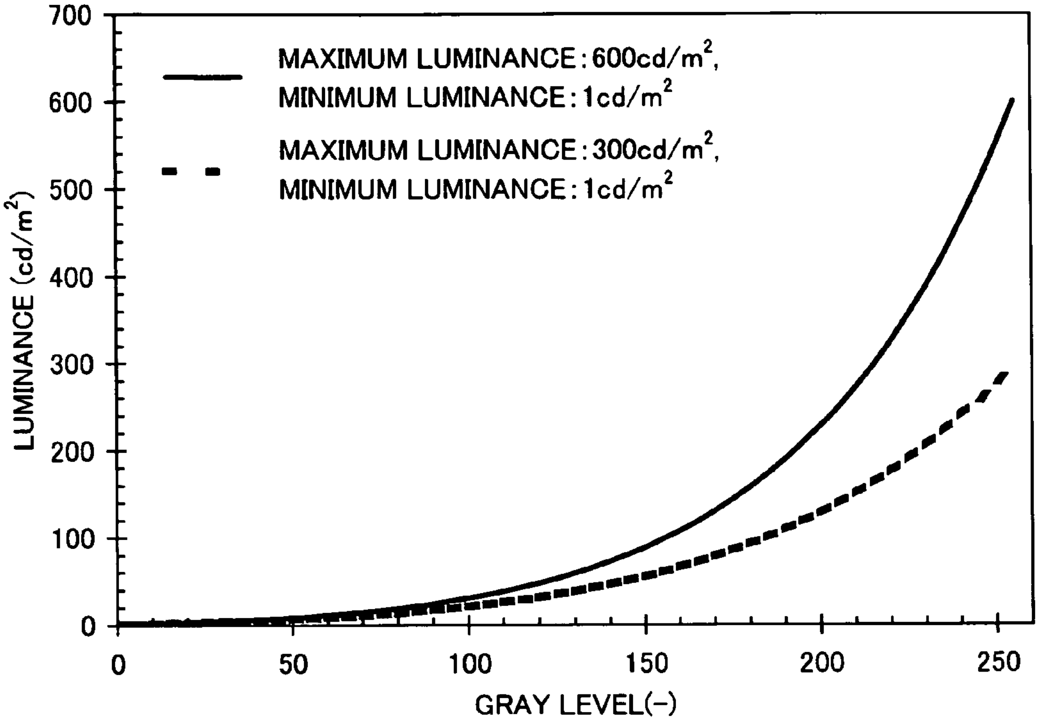
FIG. 19 is a graph showing the GSDF compatible with the DICOM.
Figure 20:
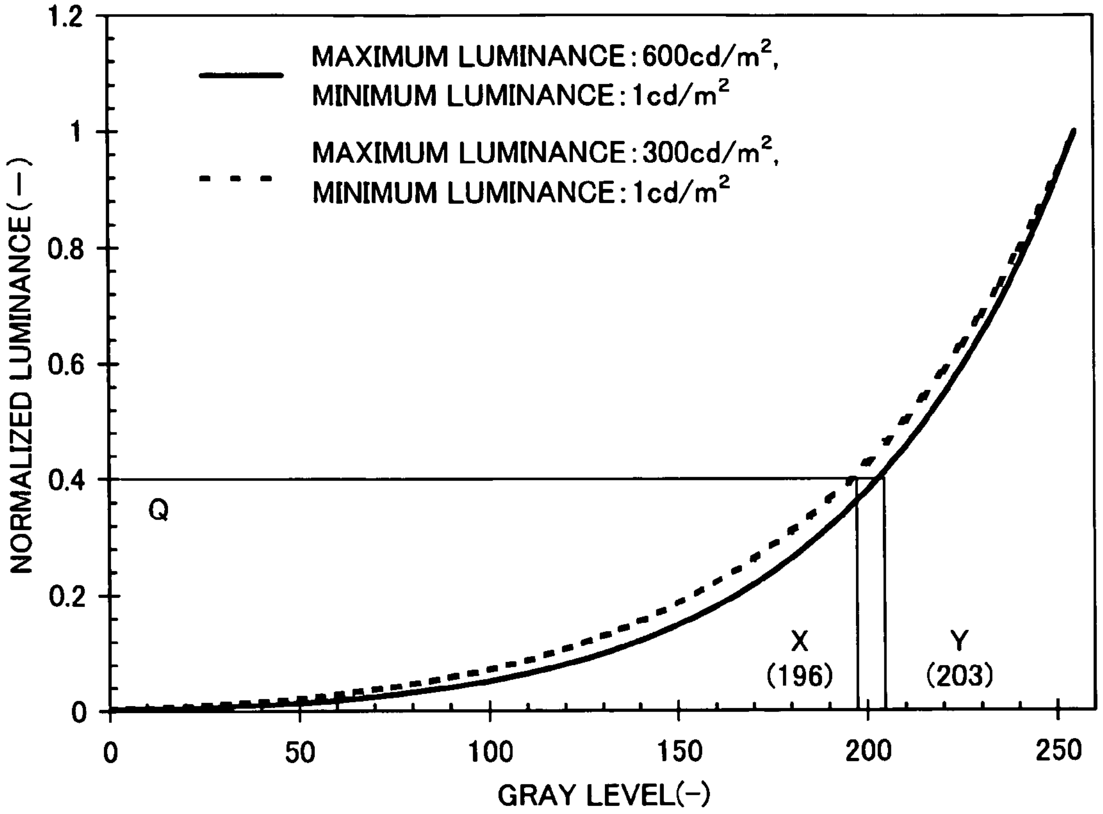
FIG. 20 is a graph of a normalized GSDF.

FIG. 12 is a flow chart showing an example of a second process procedure of the luminance control method for a liquid crystal display device according to Embodiment 2 of the present invention.

First, input of a desired maximum luminance $L_{TMAX}$ by the user of the liquid crystal display device 1 is accepted through the operation unit 5 (step S41). The control unit 2 then reads the luminances $L_{MH}$, $L_{ML}$ and output values $AD_H$, $AD_L$ stored in the storage unit 36 and calculates an output value $AD_T$ which gives the maximum luminance $L_{TMAX}$ based on the expression (4) from the read luminances $L_{MH}$, $L_{ML}$ and output values $AD_H$, $AD_L$ and the maximum luminance $L_{TMAX}$ accepted in the step S41 (step S42).

The control unit 2 then reads the normalized first color luminance $R_0/R_{1023}, R_1/R_{1023}, \ldots, R_{1023}/R_{1023}$, second color luminance $G_0/G_{1023}, G_1/G_{1023}, \ldots, G_{1023}/G_{1023}$, and third color luminance $B_0/B_{1023}, B_1/B_{1023}, \ldots, B_{1023}/B_{1023}$ stored in the storage unit 36 and calculates panel gray-level characteristic values for the respective colors $L_{TMAX}\cdot RR\cdot R_0/R_{1023}$, $L_{TMAX}\cdot RR\cdot R_1/R_{1023}, \ldots, L_{TMAX}\cdot RR\cdot R_{1023}/R_{1023}$, $L_{TMAX}\cdot GR\cdot G_0/G_{1023}$, $L_{TMAX}\cdot GR\cdot G_1/G_{1023}, \ldots, L_{TMAX}\cdot GR\cdot G_{1023}/G_{1023}$, and $L_{TMAX}\cdot BR\cdot B_0/B_{1023}$, $L_{TMAX}\cdot BR\cdot B_1/B_{1023}, \ldots, L_{TMAX}\cdot BR\cdot B_{1023}/B_{1023}$ in a case of the maximum luminance $L_{TMAX}$ by multiplying the read first color luminance $R_0/R_{1023}, R_1/R_{1023}, \ldots, R_{1023}/R_{1023}$, second color luminance $G_0/G_{1023}, G_1/G_{1023}, \ldots, G_{1023}/G_{1023}$, and third color luminance $B_0/B_{1023}, B_1/B_{1023}, \ldots, B_{1023}/B_{1023}$ by RR, GR and BR normalized in the step S37 and the maximum value $L_{TMAX}$ accepted in the step S41 (step S43).

The control unit 2 then calculates ideal gray-level characteristic values for the respective colors $TR_0, TR_1, \ldots, TR_{255}$, $TG_0, TG_1, \ldots, TG_{255}$, and $TB_0, TB_1, \ldots, TB_{255}$ in a case of the maximum luminance $L_{TMAX}$ based on the display function preliminarily stored in the storage unit 36 (step S44), compares the ideal gray-level characteristic values for the respective colors calculated in the step S44 with the panel gray-level characteristics for respective colors calculated in the step S43 to generate LUTs 36*a*, 36*b* and 36*c*, and stores them in the storage unit 36 (step S45). Since the LUT generating/storing process is the same as that of Embodiment 1, the explanation thereof is omitted.

It should be noted that, though a white screen is displayed by making the transmittance of all the pixels equal in order to obtain the first color luminance, the second color luminance and the third color luminance with the external photosensor 42 in this embodiment, a first color raster screen may be displayed by setting a voltage to be applied to pixels of the first color as $V_{1023}$ and setting a voltage to be applied to pixels of the other colors as $V_0$ in order to obtain the first color luminance with the external photosensor 42. In this manner, a gray-level characteristic having superior accuracy can be realized since the effect of the luminance of the second color and the third color on the luminance of the first color can be removed even when the wavelength bands of the respective colors are broad and overlap with each other (the same for the second color luminance and the third color luminance).

Moreover, though the photosensor 12 converts the luminance in the wavelength band of visible light into an analog signal in the above description, the luminance-output value characteristic for each color may be obtained using a photosensor for converting the luminance in the wavelength band of each of the three primary colors into an analog signal having a voltage according to the luminance. It should be understood that in this case, the analog signal is converted into a digital signal by connecting an ADC corresponding to each color with the photosensor. It is needless to say that a plurality of photosensors for converting the luminance of each of wavelength bands into an analog signal may be used.

The above-mentioned process procedure may be executed for color temperatures, e.g. a blue base (12500K) and a clear base (7500K) respectively. In this case, the storage unit 36 stores in the first process procedure the luminances $L_{MH}$, $L_{ML}$ and the output values $AD_H$, $AD_L$ for each color temperature and the normalized first color luminance $R_0/R_{1023}, R_1/R_{1023}, \ldots, R_{1023}/R_{1023}$, second color luminance $G_0/G_{1023}, G_1/G_{1023}, \ldots, G_{1023}/G_{1023}$, and third color luminance $B_0/B_{1023}, B_1/B_{1023}, \ldots, B_{1023}/B_{1023}$, selection of a desired color temperature by the user of the liquid crystal display device 1 is accepted through the operation unit 5 in the second process procedure, and a process is executed for the selected color temperature. It is needless to say that the color temperature is not limited to these two, and may be any color temperature.

Furthermore, though described in Embodiment 1 and Embodiment 2 is a manner that the control unit 2 in the liquid crystal display device executes the above software process to control luminance, a PC 21 connected with the liquid crystal device via a communication line compatible with the USB standard may perform a process similar to that of the above control unit 2. In this case, a necessary process may be executed by reading a recording medium such as a CD-ROM or a flexible disk (FD) in which the above process content is recorded as a computer program with a CD-ROM drive or a FD drive and by loading the read computer program to a memory. It is needless to say that the PC 21 may execute the process by downloading a computer program from a recording medium composed of a server device connected with a communication network such as a LAN via the communication network. Moreover, the PC 21 may comprise a storage unit for storing the above LUT 6*a* (36*a*, 36*b*, 36*c*), or the PC 21 may cause a storage unit in the liquid crystal display device to store the LUT 6*a* (36*a*, 36*b*, 36*c*).

The invention claimed is:

1. A luminance control method for a liquid crystal display device, which comprises a liquid crystal panel, a backlight disposed at the back of the liquid crystal panel and a luminance detecting unit for detecting a luminance of the backlight, for controlling an input level of a video signal to be inputted into the liquid crystal panel to control transmittance of the liquid crystal panel and provide a gray-level display, comprising performing, at a time before actually displaying an image, the steps of:

measuring a luminance of light emitted from the backlight through the liquid crystal panel in a plurality of states where the liquid crystal panel has a predetermined transmittance and the backlight has a different luminance, and preliminarily storing the measured luminance of light emitted through the liquid crystal panel as associated with the luminance of the backlight detected by the luminance detecting unit for each of the plurality of states, respectively; and measuring a luminance of light emitted through the liquid crystal panel in each input level, and preliminarily storing the measured luminance associated with an input level which gives the luminance; and subsequently performing, at a time of actually displaying the image, the steps of:

setting a desired luminance set value of light emitted through the liquid crystal panel in a state where the liquid crystal panel has a predetermined transmittance, calculating a luminance of the backlight to be detected by the luminance detecting unit which results in the set desired luminance set value of light emitted through the liquid crystal panel, on the basis of the preliminarily stored luminance association in each state;

controlling the luminance of the backlight so as to be the calculated luminance;

calculating a luminance of light emitted through the liquid crystal panel in each input level and a luminance to be set in each gray level in a case of the luminance set value, on the basis of the stored luminance and input level;

extracting an input level, which gives a luminance substantially equal to the luminance to be set in each gray level, on the basis of the luminance in each calculated input level and the luminance to be set in each gray level, and storing the extracted input level associated with a gray level; and controlling the transmittance of the liquid crystal panel in a gray level associated with the input level of the video signal.

2. The luminance control method according to claim 1, wherein the luminance set value is a luminance in a state where the transmittance of the liquid crystal panel is a controllable maximum transmittance.

3. The luminance control method according to claim 1, wherein one state of the plurality of states is a state where the backlight has a controllable maximum luminance and another state of the plurality of states is a state where the backlight has a controllable minimum luminance.

4. The luminance control method according to claim 2, wherein one state of the plurality of states is a state where the backlight has a controllable maximum luminance and another state of the plurality of states is a state where the backlight has a controllable minimum luminance.

5. A luminance control method for a liquid crystal display device, which comprises a liquid crystal panel, a backlight disposed at the back of the liquid crystal panel and a luminance detecting unit for detecting a luminance of the backlight, for controlling an input level of a video signal to be inputted into the liquid crystal panel to control transmittance of the liquid crystal panel and provide a gray-level display, comprising performing, at a time before actually displaying an image, the steps of:

measuring a luminance of light emitted from the backlight through the liquid crystal panel in a plurality of states where the liquid crystal panel has a predetermined transmittance and the backlight has a different luminance, and preliminarily storing the measured luminance of light emitted through the liquid crystal panel as associated with the luminance of the backlight detected by the luminance detecting unit for each of the plurality of states, respectively; and subsequently performing, at a time of actually displaying the image, the steps of:

setting a desired luminance set value of light emitted through the liquid crystal panel in a state where the liquid crystal panel has a predetermined transmittance;

calculating a luminance of the backlight to be detected by the luminance detecting unit which results in the set desired luminance set value of light emitted through the liquid crystal panel, on the basis of the preliminarily stored luminance association in each state; and controlling the luminance of the backlight so as to be the calculated luminance, the method further comprising the steps of:

measuring a luminance of light emitted through the liquid crystal panel in each input level;

normalizing each measured luminance, and preliminarily storing each normalized luminance associated with an input level which gives the luminance;

calculating a luminance of light emitted through the liquid crystal panel in each input level and a luminance to be set in each gray level in a case of the luminance set value, on the basis of the stored luminance and input level;

extracting an input level, which gives a luminance substantially equal to a luminance to be set in each gray level, on the basis of the luminance in each calculated input level and the luminance to be set in each gray level, and storing the extracted input level associated with a gray level; and controlling the transmittance of the liquid crystal panel in a gray level associated with the input level of the video signal.

6. The luminance control method according to claim 5, wherein the luminance set value is a luminance in a state where the transmittance of the liquid crystal panel is a controllable maximum transmittance.

7. The luminance control method according to claim 5, wherein one state of the plurality of states is a state where the backlight has a controllable maximum luminance and another state of the plurality of states is a state where the backlight has a controllable minimum luminance.

8. The luminance control method according to claim 6, wherein one state of the plurality of states is a state where the backlight has a controllable maximum luminance and another state of the plurality of states is a state where the backlight has a controllable minimum luminance.

9. A liquid crystal display device, which comprises a liquid crystal panel and a backlight disposed at the back of the liquid crystal panel, for controlling an input level of a video signal to be inputted to the liquid crystal panel to control transmittance of the liquid crystal panel and provide a gray-level display, comprising:

a luminance detecting unit for detecting a luminance of the backlight;

a first storage unit for preliminarily storing, at a time before actually displaying an image, first information in which the luminance detected by the luminance detecting unit, in a plurality of states where the liquid crystal panel has a predetermined transmittance and the backlight has a different luminance, is associated with a luminance of light emitted from the backlight through the liquid crystal panel;

an accepting unit for accepting, at a time of actually displaying the image, a desired luminance set value of light emitted through the liquid crystal panel in a state where the liquid crystal panel has a predetermined transmittance;

a first calculating unit for calculating, at a time of actually displaying the image, a luminance of the backlight to be detected by the luminance detecting unit which results in the desired luminance set value of light emitted through the liquid crystal panel accepted by the accepting unit, on the basis of the first information preliminarily stored in the first storage unit; and a luminance control unit for controlling, at a time of actually displaying the image, the luminance of the backlight so as to be the luminance calculated by the first calculating unit, wherein the first storage unit further stores second information on a luminance of light emitted through the liquid crystal panel in each input level, and the liquid crystal device further comprises:

a second calculating unit for calculating a luminance of light emitted through the liquid crystal panel in each input level in a case of the luminance set value accepted by the accepting unit, on the basis of the second information;

a third calculating unit for calculating a luminance to be set in each gray level in a case of the luminance set value accepted by the accepting unit;

a fourth calculating unit for calculating a luminance difference between the luminance to be set in each gray level calculated by the third calculating unit and the luminance in each input level calculated by the second calculating unit;

a second storage unit for storing an input level, which gives a minimum luminance difference calculated by the fourth calculating unit, associated with a gray level; and a control unit for controlling the transmittance of the liquid crystal panel in a gray level associated with the input level of the video signal.

10. The liquid crystal display device according to claim 9, wherein the luminance detecting unit has: a photoelectric converter for converting the luminance of the backlight into an analog-type electric signal having a voltage corresponding to the luminance of the backlight; and an analog-digital converter for converting the converted analog-type electric signal into a digital-type electric signal.

11. A recording medium on which a computer program for causing a computer to output control information to a liquid crystal display device comprising a liquid crystal panel and a backlight disposed at the back of the liquid crystal panel and causing the computer to control an input level of a video signal to be inputted into the liquid crystal panel to control transmittance of the liquid crystal panel and provide a gray-level display is recorded, said computer program comprising performing, at a time before actually displaying an image, the step of:

causing the computer to preliminarily store in a storage unit a luminance of the backlight, in a plurality of states where the backlight has a different luminance, as associated with a luminance of light emitted from the backlight through the liquid crystal panel in each of the plurality of states, respectively; and subsequently performing, at a time of actually displaying the image, the steps of:

causing the computer to set a desired luminance set value of light emitted through the liquid crystal panel;

causing the computer to calculate control information for controlling a luminance of the backlight which results in the set luminance set value of light being emitted through the liquid crystal panel, on the basis of first information preliminarily stored in the storage unit; and causing the computer to output the calculated control information to the liquid crystal display device, wherein said computer program further comprises the steps of:

causing the computer to store in a storage unit second information on a luminance of light emitted through the liquid crystal panel in each input level;

causing the computer to calculate a luminance of light emitted through the liquid crystal panel in each input level in a case of the inputted luminance set value, on the basis of the stored second information;

causing the computer to calculate a luminance to be set in each gray level in a case of the inputted luminance set value;

causing the computer to calculate a luminance difference between the calculated luminance to be set in each gray level and the calculated luminance in each input level; and causing the computer to store in the storage unit an input level, which gives a minimum calculated luminance difference, associated with a gray level.

* * * * *